(12) United States Patent
Jindou et al.

(10) Patent No.: US 10,465,924 B2
(45) Date of Patent: Nov. 5, 2019

(54) HEAT EXCHANGER

(71) Applicant: DAIKIN INDUSTRIES, LTD., Osaka-shi, Osaka (JP)

(72) Inventors: Masanori Jindou, Sakai (JP); Masahiro Tsutsui, Sakai (JP); Yoshio Oritani, Sakai (JP); Junichi Hamadate, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/523,224

(22) PCT Filed: Nov. 9, 2015

(86) PCT No.: PCT/JP2015/081464
§ 371 (c)(1),
(2) Date: Apr. 28, 2017

(87) PCT Pub. No.: WO2016/076260
PCT Pub. Date: May 19, 2016

(65) Prior Publication Data
US 2017/0314792 A1    Nov. 2, 2017

(30) Foreign Application Priority Data

Nov. 14, 2014   (JP) ................................ 2014-231705

(51) Int. Cl.
*F28F 9/02* (2006.01)
*F24F 1/18* (2011.01)
*F28F 1/02* (2006.01)

(52) U.S. Cl.
CPC .................. *F24F 1/18* (2013.01); *F28F 1/02* (2013.01); *F28F 9/0202* (2013.01); *F28F 2280/04* (2013.01)

(58) Field of Classification Search
CPC .... F28F 2280/04; F28F 9/0202; F28F 9/0214; F28F 9/0209; F28F 9/0204; F28F 9/0207;
(Continued)

(56) References Cited

U.S. PATENT DOCUMENTS 5,366,007 A * 11/1994 Hutto .................. F28D 1/05375
                                                    165/153
7,523,782 B2 * 4/2009 Lorentz ................. F28F 9/0212
                                                    165/174
(Continued)

FOREIGN PATENT DOCUMENTS

CN        203214362 U     11/2013
EP        1813903 A1 *   8/2007 ......... F28D 1/05391
(Continued)

OTHER PUBLICATIONS

Notification of Reasons for Refusal of corresponding JP Application No. 2014-231705 dated Jan. 4, 2016.
(Continued)

*Primary Examiner* — Christopher R Zerphey
*Assistant Examiner* — Harry E Arant
(74) *Attorney, Agent, or Firm* — Global IP Counselors, LLP

(57) ABSTRACT

A heat exchanger includes a plurality of flat tubes and a coupling header. The flat tubes are disposed in multiple tiers along a predetermined tube tier direction and in multiple rows so as to be adjacent to each other in a tube row direction intersecting the tube tier direction and the longitudinal direction of the flat tubes. The coupling header is formed by joining a first member to a plurality of second members in the tube tier direction. The first member has a plurality of through holes through which pass the first end portions of the flat tubes. The second members when joined to the first member forming a plurality of coupling passages where the first end portions of the flat tubes adjacent to each other in the tube row direction communicate with each other.

16 Claims, 15 Drawing Sheets

(58) Field of Classification Search
CPC .... F28F 9/0212; F28F 1/02; F28F 9/02; F28F 9/0243; F24F 1/18; F28D 1/05375
See application file for complete search history.

(56) References Cited

U.S. PATENT DOCUMENTS

| | | | | |
|---|---|---|---|---|
| 2011/0240271 | A1* | 10/2011 | Mross | F28D 1/05391 165/166 |
| 2015/0059401 | A1* | 3/2015 | Matsuda | F28F 9/0204 62/498 |

FOREIGN PATENT DOCUMENTS

| | | |
|---|---|---|
| GB | 2 271 630 A | 4/1994 |
| JP | 5-25185 U | 4/1993 |
| JP | 11-230688 A | 8/1999 |
| JP | 2000-301936 A | 10/2000 |
| JP | 2006-105201 A | 4/2006 |
| JP | 2007-93025 A | 4/2007 |
| JP | 2007-147128 A | 6/2007 |
| JP | 2007-278556 A | 10/2007 |
| JP | 2011-214827 A | 10/2011 |
| JP | 2012-159211 A | 8/2012 |
| JP | 2012-233615 A | 11/2012 |

OTHER PUBLICATIONS

International Search Report of corresponding PCT Application No. PCT/JP2015/081464 dated Jan. 12, 2016.
International Preliminary Report of corresponding PCT Application No. PCT/JP2015/081464 dated May 26, 2017.
European Search Report of corresponding EP Application No. 15 85 8377.3 dated Sep. 10, 2018.

* cited by examiner

HEAT EXCHANGER

CROSS-REFERENCE TO RELATED APPLICATIONS

This U.S. National stage application claims priority under 35 U.S.C. § 119(a) to Japanese Patent Application No. 2014-231705, filed in Japan on Nov. 14, 2014, the entire contents of which are hereby incorporated herein by reference.

TECHNICAL FIELD

The present invention relates to a heat exchanger, and particularly a heat exchanger where plural flat tubes disposed in multiple tiers along a predetermined tube tier direction are disposed in multiple rows so as to be adjacent to each other in a tube row direction intersecting the tube tier direction and the longitudinal direction of the flat tubes and where one end portions in the longitudinal direction of the flat tubes adjacent to each other in the tube row direction communicate with each other via a coupling header.

BACKGROUND ART

Conventionally, as described in JP-A No. 2007-147128, there has been a heat exchanger where plural flat tubes disposed in multiple tiers along a predetermined tube tier direction are disposed in multiple rows so as to be adjacent to each other in a tube row direction intersecting the tube tier direction and the longitudinal direction of the flat tubes and where one end portions in the longitudinal direction of the flat tubes adjacent to each other in the tube row direction communicate with each other via a coupling header. Here, as the coupling header, a structure is disclosed where intermediate plates, in which are formed communicating holes for forming coupling passages that allow the one end portions in the longitudinal direction of the flat tubes adjacent to each other in the tube row direction to communicate with each other, are inserted into and joined to the inside of a square pipe-shaped main plate in which are formed through holes for inserting the flat tubes.

SUMMARY

The coupling header of patent document 1 is configured from two types of members including the main plate and the intermediate plates (below, this kind of structure will be called a "two-types-of-members structure"), so it has the advantages that there are few joints and it is difficult for joining problems to occur.

However, in the coupling header of patent document 1, when the size of the heat exchanger in the tube tier direction becomes larger as a result of the number of tiers of flat tubes becoming greater, for example, the size of the coupling header in the tube tier direction also becomes larger (below, this will be called "lengthening"), so it is necessary to insert long intermediate plates into the inside of the square pipe-shaped main plate. At this time, high dimensional precision is required of the intermediate plates and the main plate, and the level of difficulty of the actual work of inserting the intermediate plates also becomes higher, so the manufacture of the coupling header ends up becoming difficult.

It is an object of the present invention to be able to accommodate lengthening while employing a coupling header having a two-types-of-members structure in a heat exchanger where plural flat tubes disposed in multiple tiers along a predetermined tube tier direction are disposed in multiple rows so as to be adjacent to each other in a tube row direction intersecting the tube tier direction and the longitudinal direction of the flat tubes and where one end portions in the longitudinal direction of the flat tubes adjacent to each other in the tube row direction communicate with each other via a coupling header.

A heat exchanger pertaining to a first aspect is a heat exchanger where a plurality of flat tubes disposed in multiple tiers along a predetermined tube tier direction are disposed in multiple rows so as to be adjacent to each other in a tube row direction intersecting the tube tier direction and the longitudinal direction of the flat tubes and where one end portions in the longitudinal direction of the flat tubes adjacent to each other in the tube row direction communicate with each other via a coupling header. Additionally, the coupling header is configured by joining, in the tube tier direction to a first member in which are formed a plurality of through holes through which pass the one end portions in the longitudinal direction of the plurality of flat tubes, a plurality of second members that, when joined to the first member, form a plurality of coupling passages where the one end portions in the longitudinal direction of the flat tubes adjacent to each other in the tube row direction communicate with each other.

Here, the coupling header employs a two-types-of-members structure where the plural second members configuring the coupling header are joined to each other in the tube tier direction, so lengthening of the coupling header can be accommodated. For this reason, the heat exchanger whose size in the tube tier direction is large can also be accommodated.

A heat exchanger pertaining to a second aspect is the heat exchanger pertaining to the first aspect, wherein a plurality of coupling passage partition portions for partitioning the plurality of coupling passages from each other in the tube tier direction are formed side by side in the tube tier direction in the second members. Additionally, the coupling passage partition portions disposed in segments where the second members contact each other in the tube tier direction are smaller in thickness in the tube tier direction compared to the coupling passage partition portions disposed in segments where the second members do not contact each other in the tube tier direction.

Here, the pressure resistance performance of the coupling header in the segments where the second members contact each other in the tube tier direction can be ensured without having to needlessly increase the thickness in the tube tier direction of the coupling passage partition portions disposed in the segments where the second members contact each other in the tube tier direction.

A heat exchanger pertaining to a third aspect is the heat exchanger pertaining to the second aspect, wherein the thickness in the tube tier direction of the coupling passage partition portions disposed in the segments where the second members contact each other in the tube tier direction is half the thickness in the tube tier direction of the coupling passage partition portions disposed in the segments where the second members do not contact each other in the tube tier direction.

Here, the thickness in the tube tier direction of the coupling passage partition portions disposed in the segments where the second members contact each other in the tube tier direction is made the same as the thickness of the coupling passage partition portions disposed in the segments where the second members do not contact each other in the tube tier direction, so that an equal pressure resistance performance can be ensured in all segments in the tube tier direction.

A heat exchanger pertaining to a fourth aspect is the heat exchanger pertaining to the second or third aspect, wherein the second members are joined to each other and to the first member by a brazing filler metal provided on surfaces of the coupling passage partition portions.

Here, the first member and the second members can be joined to each other by brazing utilizing the coupling passage partition portions of the second members.

A heat exchanger pertaining to a fifth aspect is the heat exchanger pertaining to any of the first to fourth aspects, wherein incorrect assembly prevention portions for preventing placement direction incorrectness are formed in the second members configuring end portions in the tube tier direction of the coupling header.

Here, by forming the incorrect assembly prevention portions in the second members configuring the end portions in the tube tier direction of the coupling header, the second members configuring the end portions in the tube tier direction of the coupling header can be assembled to segments of the first member configuring the end portions in the tube tier direction of the coupling header without getting the placement direction incorrect.

A heat exchanger pertaining to a sixth aspect is the heat exchanger pertaining to the fifth aspect, wherein the incorrect assembly prevention portions limit, so as to make smaller than a predetermined insertion length, the insertion length of the plurality of flat tubes with respect to the plurality of through holes formed in the segments of the first member configuring the end portions in the tube tier direction of the coupling header in a case where the placement direction of the second members configuring the end portions in the tube tier direction of the coupling header is incorrect.

Here, in a case where the placement direction of the second members configuring the end portions in the tube tier direction of the coupling header is incorrect, the insertion length of the flat tubes with respect to the through holes in the first member becomes insufficient because of the incorrect assembly prevention portions, so the fact that the placement direction of the second members configuring the end portions in the tube tier direction of the coupling header is incorrect can be recognized.

A heat exchanger pertaining to a seventh aspect is a heat exchanger where a plurality of flat tubes disposed in multiple tiers along a predetermined tube tier direction are disposed in multiple rows so as to be adjacent to each other in a tube row direction intersecting the tube tier direction and the longitudinal direction of the flat tubes and where one end portions in the longitudinal direction of the flat tubes adjacent to each other in the tube row direction communicate with each other via a coupling header. Additionally, the coupling header is configured by joining, in the tube tier direction to a first member, a plurality of second members in which are formed a plurality of through holes through which pass the one end portions in the longitudinal direction of the plurality of flat tubes and which, when joined to the first member, form a plurality of coupling passages where the one end portions in the longitudinal direction of the flat tubes adjacent to each other in the tube row direction communicate with each other.

Here, the coupling header employs a two-types-of-members structure where the plural second members configuring the coupling header are joined to each other in the tube tier direction, so lengthening of the coupling header can be accommodated. For this reason, the heat exchanger whose size in the tube tier direction is large can also be accommodated.

DESCRIPTION OF EMBODIMENT

An embodiment of a heat exchanger pertaining to the present invention and example modifications thereof will be described below on the basis of the drawings. It should be noted that the specific configurations of the heat exchanger pertaining to the present invention are not limited to those in the following embodiment and the example modifications thereof, and can be changed to the extent that they do not depart from the spirit of the invention.

(1) Basic Configuration of Air Conditioning Apparatus

Figure 1:
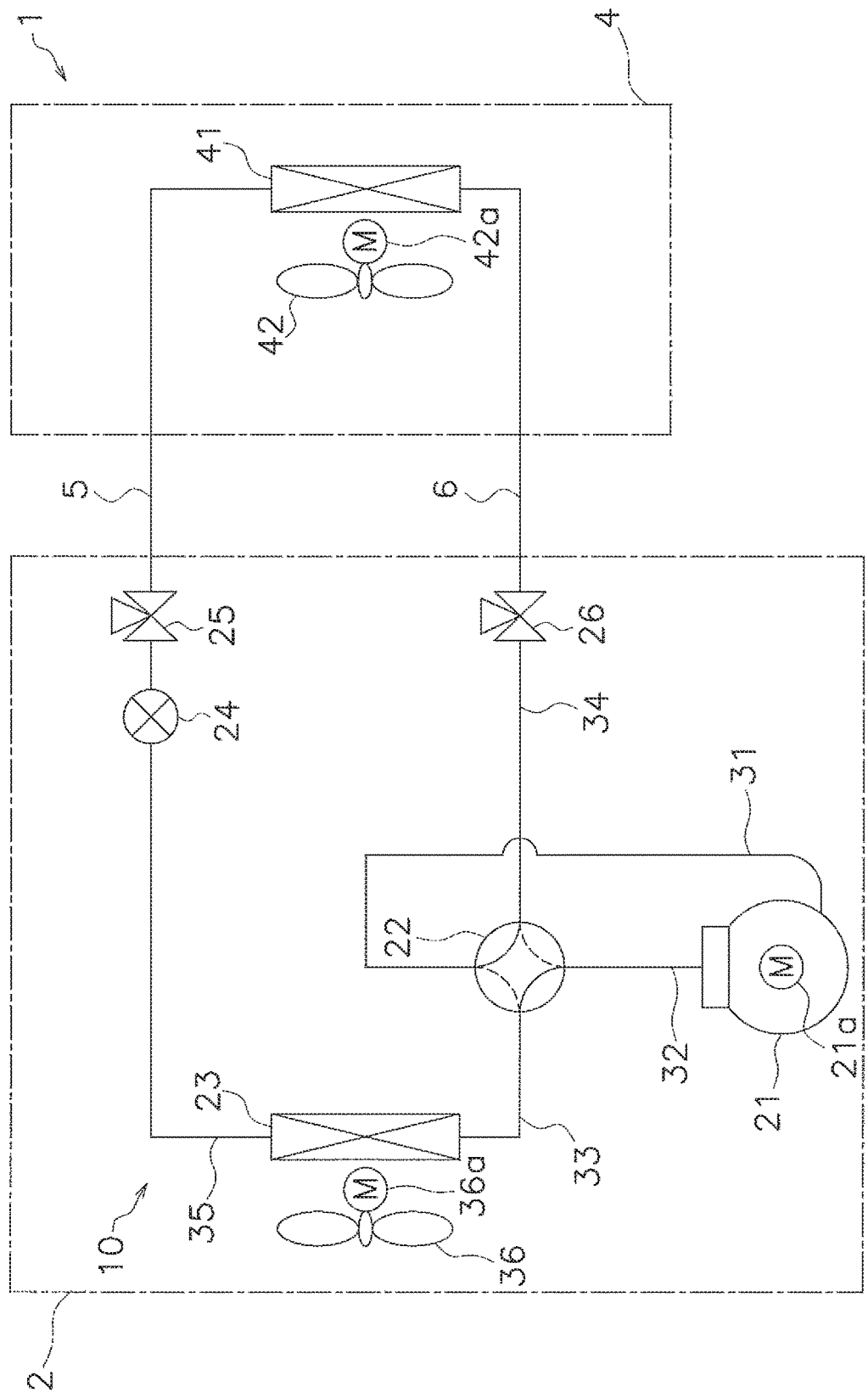
FIG. 1 is a general configuration diagram of an air conditioning apparatus that employs an outdoor heat exchanger serving as a heat exchanger pertaining to an embodiment of the present invention.

FIG. 1 is a general configuration diagram of an air conditioning apparatus 1 that employs an outdoor heat exchanger 23 serving as a heat exchanger pertaining to an embodiment of the present invention.

The air conditioning apparatus 1 is an apparatus capable of cooling and heating a room in a building or the like by performing a vapor compression refrigeration cycle. The air conditioning apparatus 1 is configured as a result of mainly an outdoor unit 2 and an indoor unit 4 being connected to each other. Here, the outdoor unit 2 and the indoor unit 4 are connected to each other via a liquid refrigerant connection pipe 5 and a gas refrigerant connection pipe 6. That is, a vapor compression refrigerant circuit 10 of the air conditioning apparatus 1 is configured as a result of the outdoor unit 2 and the indoor unit 4 being connected to each other via the refrigerant connection pipes 5 and 6.

<Indoor Unit>

The indoor unit 4 is installed in a room and configures part of the refrigerant circuit 10. The indoor unit 4 mainly has an indoor heat exchanger 41.

The indoor heat exchanger 41 is a heat exchanger which, during the cooling operation, functions as a refrigerant evaporator to cool the room air and which, during the heating operation, functions as the refrigerant radiator to heat the room air. The liquid side of the indoor heat exchanger 41 is connected to the liquid refrigerant connection pipe 5, and the gas side of the indoor heat exchanger 41 is connected to the gas refrigerant connection pipe 6.

The indoor unit 4 has an indoor fan 42 for sucking the room air into the indoor unit 4, allowing the room air to exchange heat with the refrigerant in the indoor heat exchanger 41, and thereafter supplying the air as supply air to the room. That is, the indoor unit 4 has the indoor fan 42 as a fan that supplies to the indoor heat exchanger 41 the room air serving as a heating source or a cooling source for the refrigerant flowing in the indoor heat exchanger 41. Here, a centrifugal fan or a multi-blade fan driven by an indoor fan motor 42a is used as the indoor fan 42.

<Outdoor Unit>

The outdoor unit 2 is installed outdoors and configures part of the refrigerant circuit 10. The outdoor unit 2 mainly has a compressor 21, a four-way switching valve 22, an outdoor heat exchanger 23 (heat exchanger), an expansion valve 24, a liquid-side stop valve 25, and a gas-side stop valve 26.

The compressor 21 is a device that compresses refrigerant at a low pressure in the refrigeration cycle to a high pressure. The compressor 21 has a closed structure where a rotary-type or scroll-type positive-displacement compression element (not shown in the drawings) is driven to rotate by a compressor motor 21a. The compressor 21 has a suction pipe 31 connected to its suction side and a discharge pipe 32 connected to its discharge side. The suction pipe 31 is a refrigerant pipe that interconnects the suction side of the compressor 21 and the four-way switching valve 22. The discharge pipe 32 is a refrigerant pipe that interconnects the discharge side of the compressor 21 and the four-way switching valve 22.

The four-way switching valve 22 is a switching valve for switching the direction of the flow of the refrigerant in the refrigerant circuit 10. During the cooling operation the four-way switching valve 22 switches to a cooling cycle state in which it causes the outdoor heat exchanger 23 to function as a radiator of the refrigerant that has been compressed in the compressor 21 and causes the indoor heat exchanger 41 to function as an evaporator of the refrigerant that has radiated heat in the outdoor heat exchanger 23. That is, during the cooling operation the four-way switching valve 22 interconnects the discharge side of the compressor 21 (here, the discharge pipe 32) and the gas side of the outdoor heat exchanger 23 (here, a first gas refrigerant pipe 33) (see the solid lines of the four-way switching valve 22 in FIG. 1). Moreover, the four-way switching valve 22 interconnects the suction side of the compressor 21 (here, the suction pipe 31) and the gas refrigerant connection pipe 6 side (here, a second gas refrigerant pipe 34) (see the solid lines of the four-way switching valve 22 in FIG. 1). Furthermore, during the heating operation the four-way switching valve 22 switches to a heating cycle state in which it causes the outdoor heat exchanger 23 to function as an evaporator of the refrigerant that has radiated heat in the indoor heat exchanger 41 and causes the indoor heat exchanger 41 to function as a radiator of the refrigerant that has been compressed in the compressor 21. That is, during the heating operation the four-way switching valve 22 interconnects the discharge side of the compressor 21 (here, the discharge pipe 32) and the gas refrigerant connection pipe 6 side (here, the second gas refrigerant pipe 34) (see the dashed lines of the four-way switching valve 22 in FIG. 1). Moreover, the four-way switching valve 22 interconnects the suction side of the compressor 21 (here, the suction pipe 31) and the gas side of the outdoor heat exchanger 23 (here, the first gas refrigerant pipe 33) (see the dashed lines of the four-way switching valve 22 in FIG. 1). Here, the first gas refrigerant pipe 33 is a refrigerant pipe that interconnects the four-way switching valve 22 and the gas side of the outdoor heat exchanger 23. The second gas refrigerant pipe 34 is a refrigerant pipe that interconnects the four-way switching valve 22 and the gas-side stop valve 26.

The outdoor heat exchanger 23 is a heat exchanger which, during the cooling operation, functions as a refrigerant radiator using outdoor air as a cooling source and which, during the heating operation, functions as a refrigerant evaporator using outdoor air as a heating source. The liquid side of the outdoor heat exchanger 23 is connected to a liquid refrigerant pipe 35, and the gas side of the outdoor heat exchanger 23 is connected to the first gas refrigerant pipe 33. The liquid refrigerant pipe 35 is a refrigerant pipe that interconnects the liquid side of the outdoor heat exchanger 23 and the liquid refrigerant connection pipe 5 side.

The expansion valve 24 is a valve which, during the cooling operation, reduces the pressure of refrigerant at a high pressure in the refrigeration cycle that has radiated heat in the outdoor heat exchanger 23 to a low pressure in the refrigeration cycle. Furthermore, the expansion valve 24 is a valve which, during the heating operation, reduces the pressure of refrigerant at a high pressure in the refrigeration cycle that has radiated heat in the indoor heat exchanger 41 to a low pressure in the refrigeration cycle. The expansion valve 24 is provided in a part of the liquid refrigerant pipe 35 near the liquid-side stop valve 25. Here, an electrically powered expansion valve is used as the expansion valve 24.

The liquid-side stop valve 25 and the gas-side stop valve 26 are valves provided in openings connecting to external devices and pipes (specifically, the liquid refrigerant connection pipe 5 and the gas refrigerant connection pipe 6). The liquid-side stop valve 25 is provided in the end portion of the liquid refrigerant pipe 35. The gas-side stop valve 26 is provided in the end portion of the second gas refrigerant pipe 34.

The outdoor unit 2 has an outdoor fan 36 for sucking the outdoor air into the outdoor unit 2, allowing the outdoor air to exchange heat with refrigerant in the outdoor heat exchanger 23, and thereafter discharging the air to the outside. That is, the outdoor unit 2 has the outdoor fan 36 as a fan that supplies to the outdoor heat exchanger 23 the outdoor air serving as a cooling source or a heating source for the refrigerant flowing in the outdoor heat exchanger 23. Here, a propeller fan or the like driven by an outdoor fan motor 36a is used as the outdoor fan 36.

<Refrigerant Connection Pipes>

The refrigerant connection pipes 5 and 6 are refrigerant pipes constructed on site when installing the air conditioning apparatus 1 in an installation location such as a building, and pipes having a variety of lengths and pipe diameters are used in accordance with installation conditions such as the installation location and the combination of the outdoor unit 2 and the indoor unit 4.

(2) Basic Operation of Air Conditioning Apparatus

Next, the basic operation of the air conditioning apparatus 1 will be described using FIG. 1. The air conditioning apparatus 1 can perform the cooling operation and the heating operation as its basic operation.

<Cooling Operation>

During the cooling operation the four-way switching valve 22 is switched to the cooling cycle state (the state indicated by the solid lines in FIG. 1).

In the refrigerant circuit 10, the gas refrigerant at a low pressure in the refrigeration cycle is sucked into the compressor 21, compressed to a high pressure in the refrigeration cycle, and thereafter discharged.

The high-pressure gas refrigerant that has been discharged from the compressor 21 is sent through the four-way switching valve 22 to the outdoor heat exchanger 23.

The high-pressure gas refrigerant that has been sent to the outdoor heat exchanger 23 exchanges heat with the outdoor air supplied as a cooling source by the outdoor fan 36, radiates heat, and becomes high-pressure liquid refrigerant in the outdoor heat exchanger 23 functioning as a refrigerant radiator.

The high-pressure liquid refrigerant that has radiated heat in the outdoor heat exchanger 23 is sent to the expansion valve 24.

The high-pressure liquid refrigerant that has been sent to the expansion valve 24 has its pressure reduced to a low pressure in the refrigeration cycle by the expansion valve 24 and becomes refrigerant in a low-pressure gas-liquid two-phase state. The refrigerant in the low-pressure gas-liquid two-phase state whose pressure has been reduced by the expansion valve 24 is sent through the liquid-side stop valve 25 and the liquid refrigerant connection pipe 5 to the indoor heat exchanger 41.

The refrigerant in the low-pressure gas-liquid two-phase state that has been sent to the indoor heat exchanger 41 exchanges heat with the room air supplied as a heating source by the indoor fan 42 and evaporates in the indoor heat exchanger 41. Because of this, the room air is cooled and thereafter supplied to the room; thus, cooling of the room takes place.

The low-pressure gas refrigerant that has evaporated in the indoor heat exchanger 41 is sucked through the gas refrigerant connection pipe 6, the gas-side stop valve 26, and the four-way switching valve 22 back into the compressor 21.

<Heating Operation>

During the heating operation the four-way switching valve 22 is switched to the heating cycle state (the state indicated by the dashed lines in FIG. 1).

In the refrigerant circuit 10, the gas refrigerant at a low pressure in the refrigeration cycle is sucked into the compressor 21, compressed to a high pressure in the refrigeration cycle, and thereafter discharged.

The high-pressure gas refrigerant that has been discharged from the compressor 21 is sent through the four-way switching valve 22, the gas-side stop valve 26, and the gas refrigerant connection pipe 6 to the indoor heat exchanger 41.

The high-pressure gas refrigerant that has been sent to the indoor heat exchanger 41 exchanges heat with the room air supplied as a cooling source by the indoor fan 42, radiates heat, and becomes high-pressure liquid refrigerant in the indoor heat exchanger 41. Because of this, the room air is heated and thereafter supplied to the room; thus, heating of the room takes place.

The high-pressure liquid refrigerant that has radiated heat in the indoor heat exchanger 41 is sent through the liquid refrigerant connection pipe 5 and the liquid-side stop valve 25 to the expansion valve 24.

The high-pressure liquid refrigerant that has been sent to the expansion valve 24 has its pressure reduced to a low pressure in the refrigeration cycle by the expansion valve 24 and becomes refrigerant in a low-pressure gas-liquid two-phase state. The refrigerant in the low-pressure gas-liquid two-phase state whose pressure has been reduced by the expansion valve 24 is sent to the outdoor heat exchanger 23.

The refrigerant in the low-pressure gas-liquid two-phase state that has been sent to the outdoor heat exchanger 23 exchanges heat with the outdoor air supplied as a heating source by the outdoor fan 36, evaporates, and becomes low-pressure gas refrigerant in the outdoor heat exchanger 23 functioning as a refrigerant evaporator.

The low-pressure refrigerant that has evaporated in the outdoor heat exchanger 23 is sucked through the four-way switching valve 22 back into the compressor 21.

(3) Basic Configuration of Outdoor Unit

Figure 2:
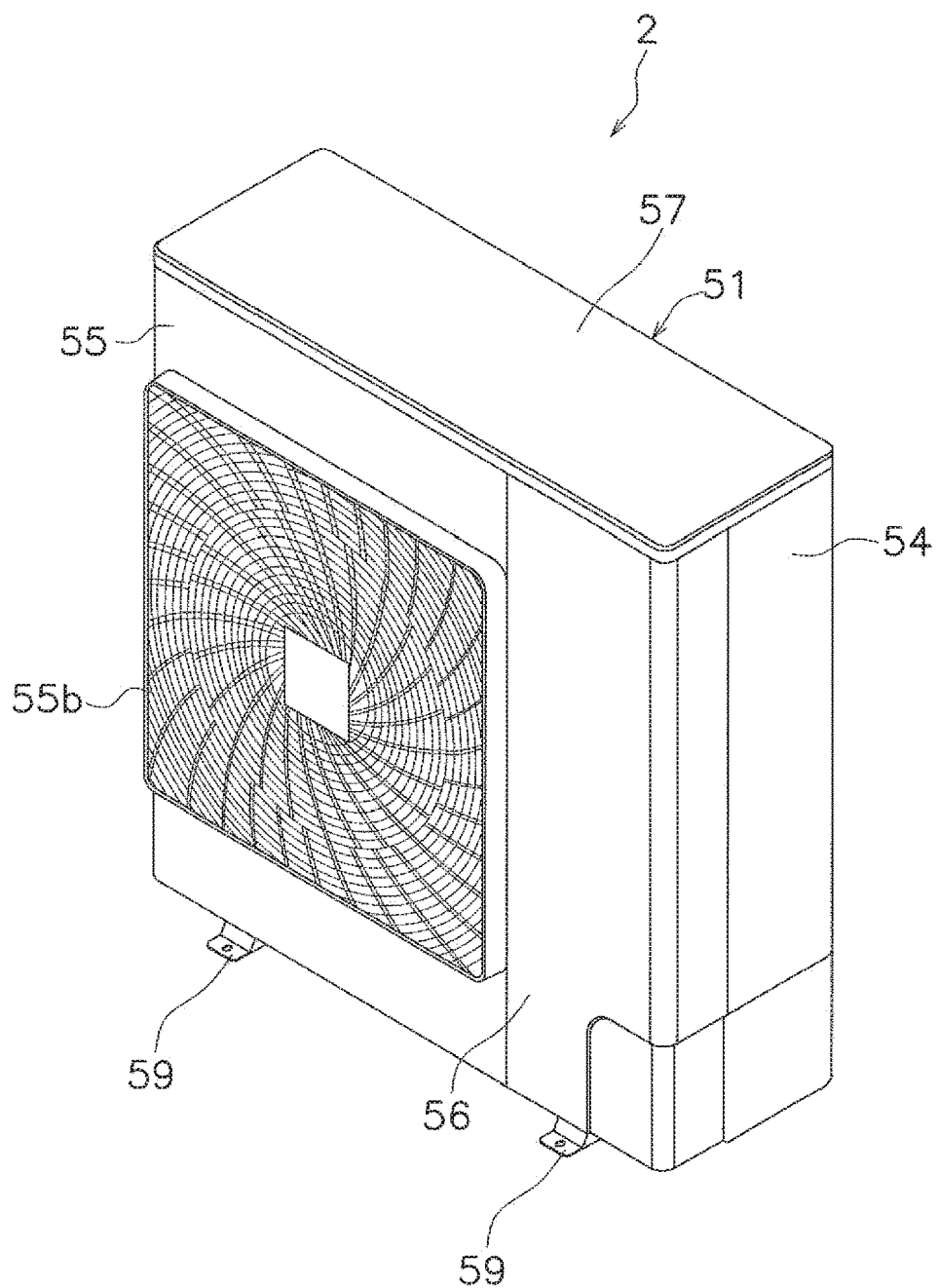
FIG. 2 is a perspective view showing the outer appearance of an outdoor unit.
Figure 3:
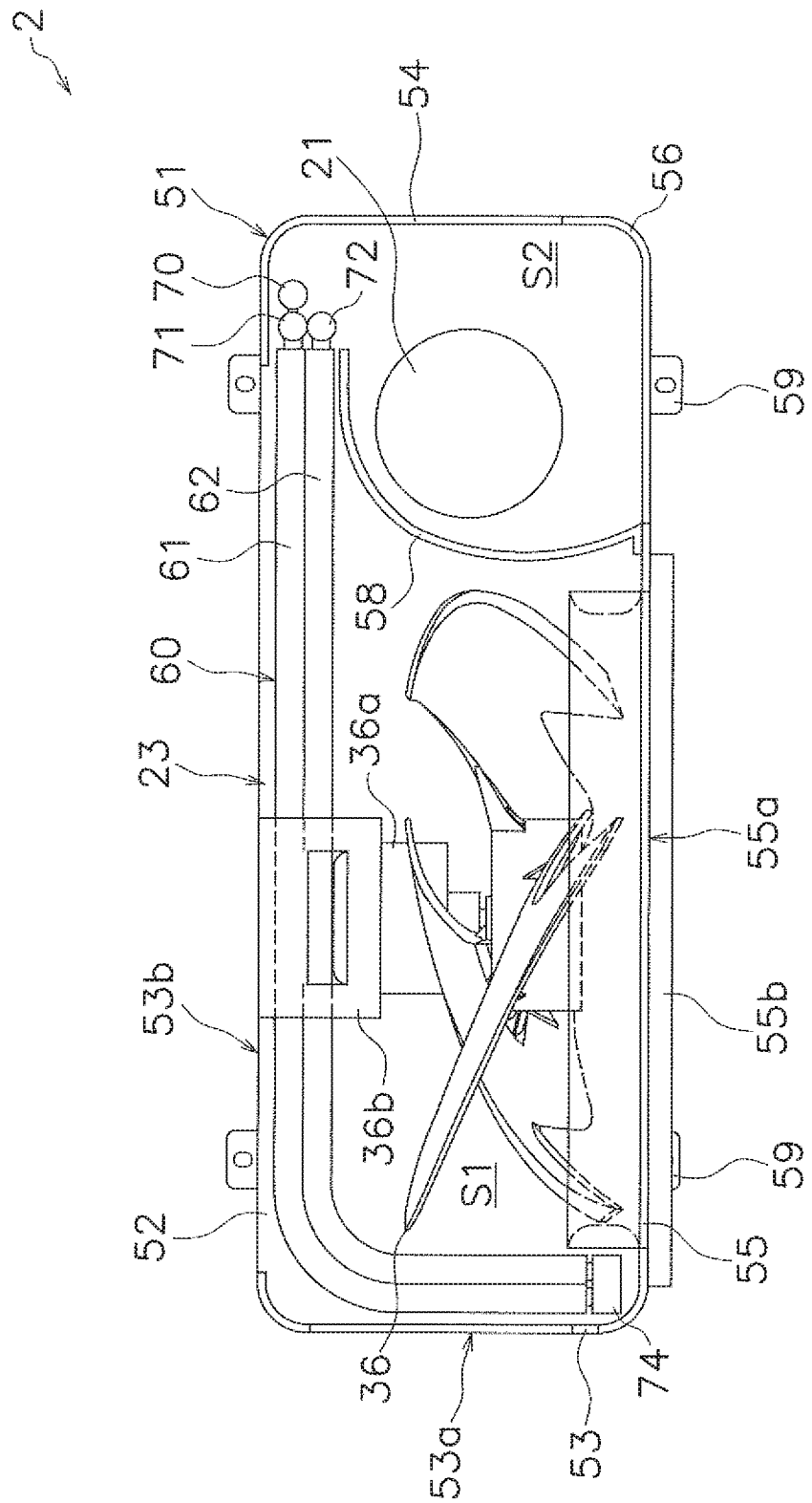
FIG. 3 is a plan view showing a state in which a top plate of the outdoor unit has been removed.
Figure 4:
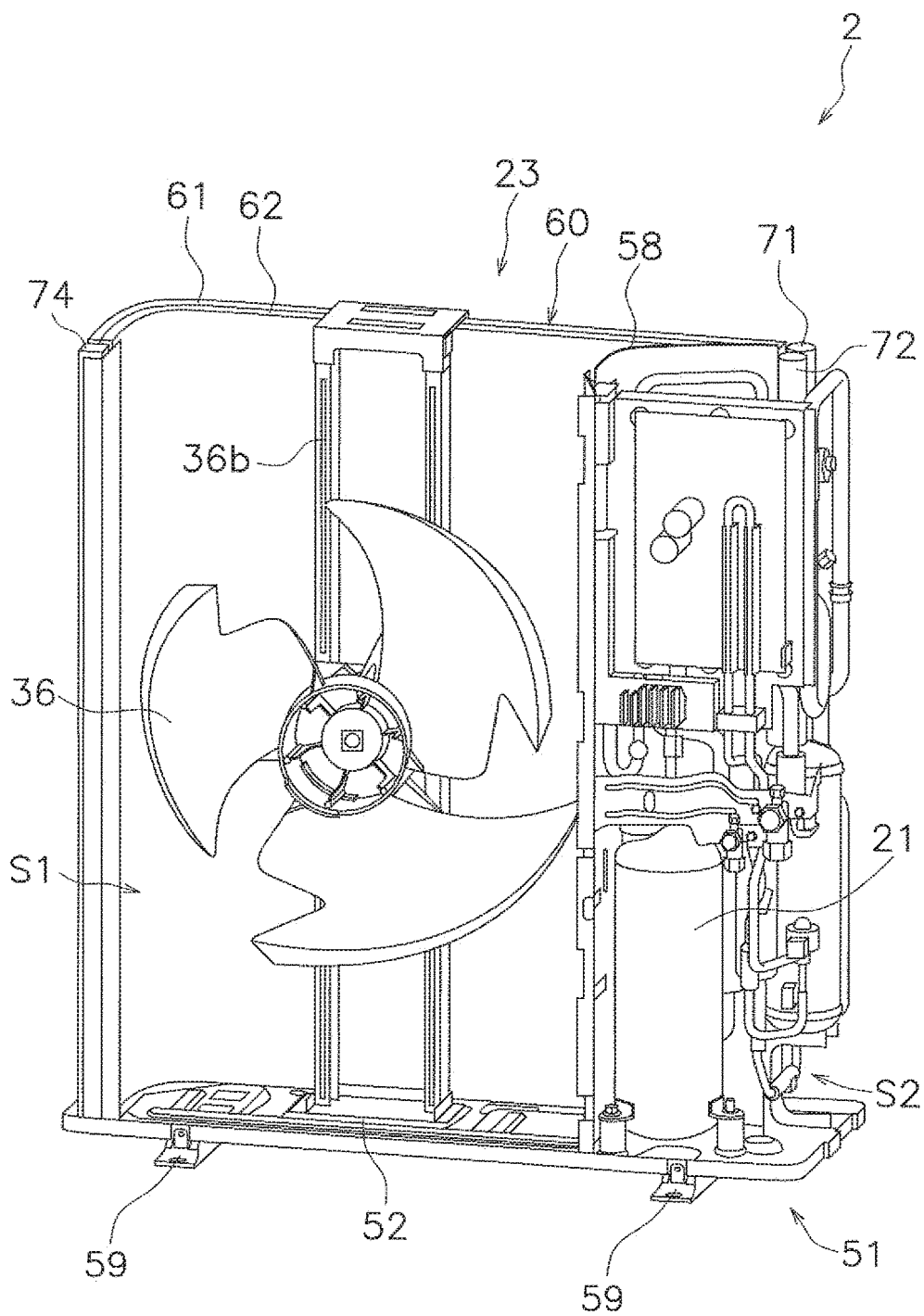
FIG. 4 is a perspective view showing a state in which the top plate, front plates, and side plates of the outdoor unit have been removed.

Next, the basic configuration of the outdoor unit 2 will be described using FIG. 1 to FIG. 4. Here, FIG. 2 is a perspective view showing the outer appearance of the outdoor unit 2. FIG. 3 is a plan view showing a state in which a top plate 57 of the outdoor unit 2 has been removed. FIG. 4 is a perspective view showing a state in which the top plate 57, front plates 55 and 56, and side plates 53 and 54 of the outdoor heat exchanger 23 have been removed. It should be noted that unless otherwise specified terms such as "upper," "lower," "left," "right," "vertical," "front surface," "side surface," "back surface," "top surface," and "bottom surface" in the following description mean directions and surfaces in a case where the surface on a fan outlet grille 55b side is taken to be the front surface.

The outdoor unit 2 has a structure (a so-called trunk structure) where the inside of a unit casing 51 is partitioned into a blower compartment S1 and a machine compartment S2 by a partition plate 58 extending in the up and down direction. The outdoor unit 2 is configured to suck the outdoor air inside from part of the back surface and side surface of the unit casing 51 and thereafter discharge the air from the front surface of the unit casing 51. The outdoor unit 2 mainly has: the unit casing 51; the devices and pipes configuring the refrigerant circuit 10, including the compressor 21, the four-way switching valve 22, the outdoor heat exchanger 23 (heat exchanger), the expansion valve 24, the stop valves 25 and 26, and the refrigerant pipes 31 to 35 interconnecting these devices; and the outdoor fan 36 and the outdoor fan motor 36a. It should be noted that although an example is described here where the blower compartment S1 is formed near the left side surface of the unit casing 51 and the machine compartment S2 is formed near the right side surface of the unit casing 51, right and left may also be reversed.

The unit casing 51 is formed in a substantially cuboid shape and mainly houses: the devices and pipes configuring the refrigerant circuit 10, including the compressor 21, the four-way switching valve 22, the outdoor heat exchanger 23, the expansion valve 24, the stop valves 25 and 26, and the refrigerant pipes 31 to 35 interconnecting these devices; and the outdoor fan 36 and the outdoor fan motor 36a. The unit casing 51 has a bottom plate 52, on which the devices and pipes 21 to 26 and 31 to 35 configuring the refrigerant circuit 10 and the outdoor fan 36 are placed, the blower compartment-side side plate 53, the machine compartment-side side plate 54, the blower compartment-side front plate 55, the machine compartment-side front plate 56, the top plate 57, and two mounting feet 59.

The bottom plate 52 is a plate-shaped member configuring the bottom surface part of the unit casing 51.

The blower compartment-side side plate 53 is a plate-shaped member configuring the side surface part (here, the left side surface part) of the unit casing 51 near the blower compartment S1. The lower portion of the blower compartment-side side plate 53 is secured to the bottom plate 52; here, the blower compartment-side side plate 53 is a member whose end portion on the front surface side is integrated with the end portion of the blower compartment-side front plate 55 on the left side surface side. In the blower compartment-side side plate 53, there is formed a side surface fan inlet 53a for the outdoor fan 36 to suck the outdoor air into the unit casing 51 from the side surface side of the unit casing 51. It should be noted that the blower compartment-side side plate 53 may also be a member separate from the blower compartment-side front plate 55.

The machine compartment-side side plate 54 is a plate-shaped member configuring part of the side surface part (here, the right side surface part) of the unit casing 51 near the machine compartment S2 and the back surface part of the unit casing 51 near the machine compartment S2. The lower portion of the machine compartment-side side plate 54 is secured to the bottom plate 52. Between the end portion of the blower compartment-side side plate 53 on the back surface side and the end portion of the machine compartment-side side plate 54 on the blower compartment S1 side, there is formed a back surface fan inlet 53b for the outdoor fan 36 to suck the outdoor air into the unit casing 51 from the back surface side of the unit casing 51.

The blower compartment-side front plate 55 is a plate-shaped member configuring the front surface part of the blower compartment S1 of the unit casing 51. The lower portion of the blower compartment-side front plate 55 is secured to the bottom plate 52; here, the blower compartment-side front plate 55 is a member whose end portion on the left side surface side is integrated with the end portion of the blower compartment-side side plate 53 on the front surface side. A fan outlet 55a for the outdoor fan 36 to blow out to the outside the outdoor air that has been sucked into the unit casing 51 is provided in the blower compartment-side front plate 55. A fan outlet grille 55b that covers the fan outlet 55a is provided in the front surface side of the blower compartment-side front plate 55. It should be noted that the blower compartment-side front plate 55 may also be a member separate from the blower compartment-side side plate 53.

The machine compartment-side front plate 56 is a plate-shaped member configuring part of the front surface part of the machine compartment S2 of the unit casing 51 and part of the side surface part of the machine compartment S2 of the unit casing 51. The end portion of the machine compartment-side front plate 56 on the blower compartment S1 side is secured to the end portion of the blower compartment-side front plate 55 on the machine compartment S2 side, and the end portion of the machine compartment-side front plate 56 on the back surface side is secured to the end portion of the machine compartment-side side plate 54 on the front surface side.

The top plate 57 is a plate-shaped member configuring the top surface part of the unit casing 51. The top plate 57 is secured to the blower compartment-side side plate 53, the machine compartment-side side plate 54, and the blower compartment-side front plate 55.

The partition plate 58 is a plate-shaped member that is disposed on the bottom plate 52 and extends in the vertical direction. The partition plate 58 here divides the inside of the unit casing 51 into right and left to form the blower compartment S1 near the left side surface and the machine compartment S2 near the right side surface. The lower portion of the partition plate 58 is secured to the bottom plate 52, the end portion of the partition plate 58 on the front surface side is secured to the blower compartment-side front plate 55, and the end portion of the partition plate 58 on the back surface side extends as far as the side end portion of the outdoor heat exchanger 23 near the machine compartment S2.

The mounting feet 59 are plate-shaped members extending in the front and rear direction of the unit casing 51. The mounting feet 59 are members secured to a mounting surface of the outdoor unit 2. Here, the outdoor unit 2 has two mounting feet 59, with one being disposed near the blower compartment S1 and the other being disposed near the machine compartment S2.

The outdoor fan 36 is a propeller fan having plural blades, and is disposed inside the blower compartment S1 in a position on the front surface side of the outdoor heat exchanger 23 so as to oppose the front surface (here, the fan outlet 55a) of the unit casing 51. The outdoor fan motor 36a is disposed inside the blower compartment S1 between the outdoor fan 36 and the outdoor heat exchanger 23 in the front and rear direction. The outdoor fan motor 36a is supported by a motor support stand 36b placed on the bottom plate 52. Additionally, the outdoor fan 36 is pivotally supported by the outdoor fan motor 36a.

The outdoor heat exchanger 23 is a heat exchanger panel having a substantially L-shape as seen in a plan view, and is placed on the bottom plate 52 inside the blower compartment S1 so as to follow the side surface (here, the left side surface) and the back surface of the unit casing 51.

The compressor 21 here is a closed compressor having the shape of an upright cylinder and is placed on the bottom plate 52 inside the machine compartment S2.

(4) Basic Configuration of Outdoor Heat Exchanger

Figure 5:
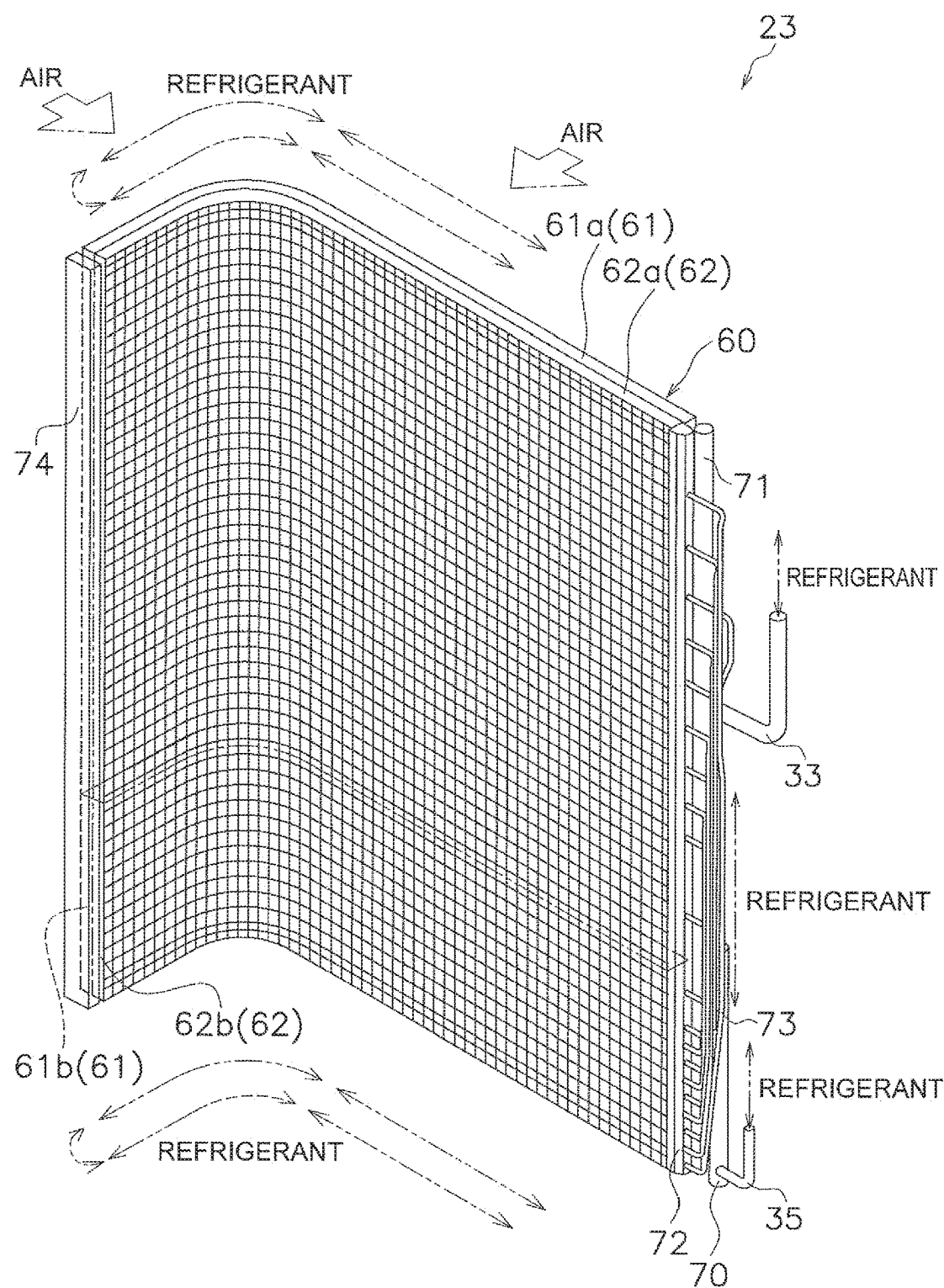
FIG. 5 is a general perspective view of the outdoor heat exchanger.
Figure 6:
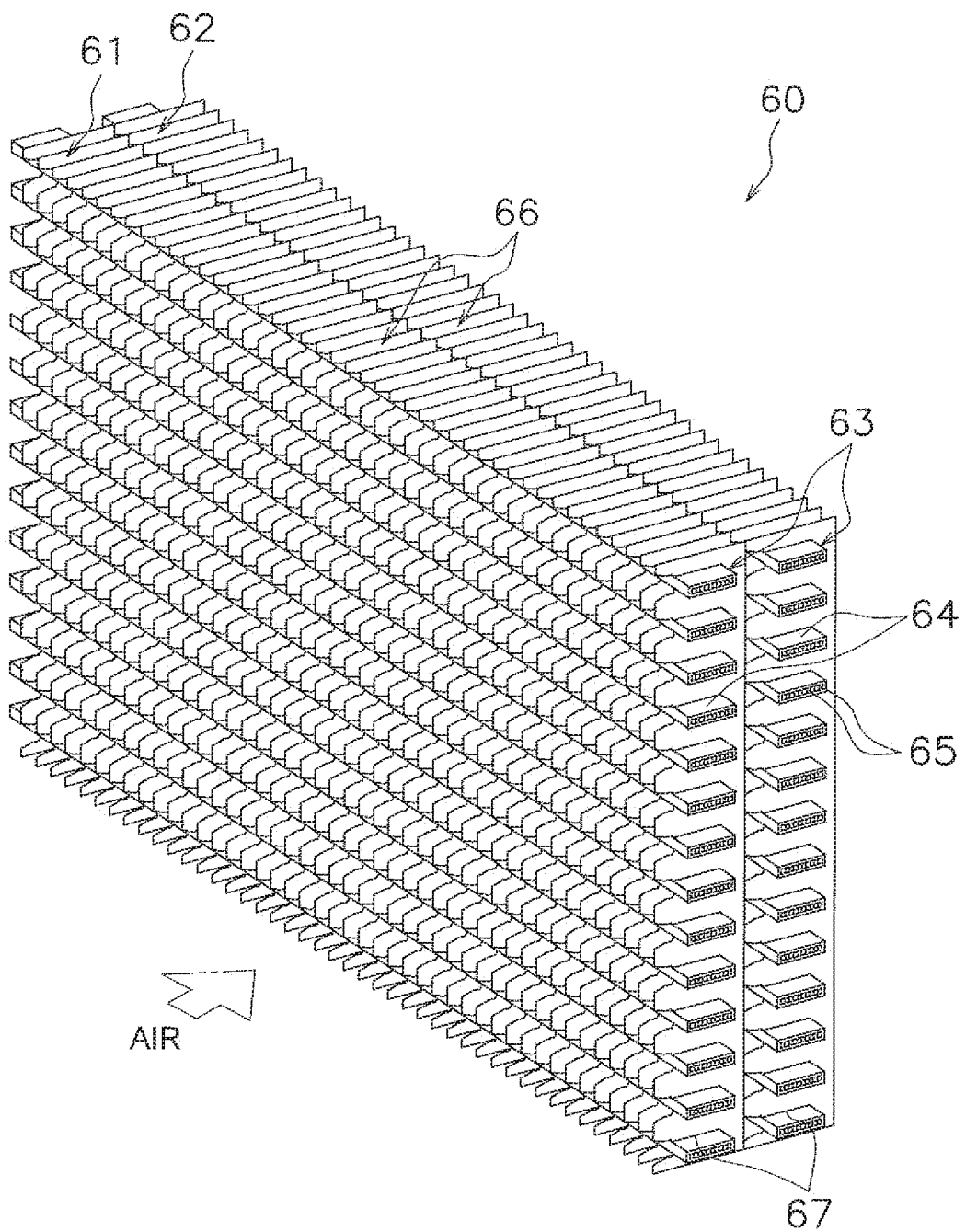
FIG. 6 is a partial enlarged view of a heat exchange section of FIG. 5.

Next, the basic configuration of the outdoor heat exchanger 23 (heat exchanger) will be described using 3 to FIG. 6. Here, FIG. 5 is a general perspective view of the outdoor heat exchanger 23. FIG. 6 is a partial enlarged view of a heat exchange section 60 of FIG. 5. It should be noted that unless otherwise specified terms indicating directions and surfaces in the following description mean directions and surfaces using as a reference a state in which the outdoor heat exchanger 23 is placed in the outdoor unit 2.

The outdoor heat exchanger 23 mainly has the heat exchange section 60 that performs heat exchange between the outdoor air and the refrigerant, a coupling header 74 provided on one end side (here, the left front end side) of the heat exchange section 60, and a refrigerant distributor 70, an inlet/outlet header 71, and an intermediate header 72 provided on the other end side (here, the right end side) of the heat exchange section 60. The outdoor heat exchanger 23 is an all-aluminum heat exchanger where the refrigerant distributor 70, the inlet/outlet header 71, the intermediate header 72, the coupling header 74, and the heat exchange section 60 are all made of aluminum or aluminum alloy, and the joining together of the various parts is carried out by brazing such as brazing in a furnace.

<Heat Exchange Section>

The heat exchange section 60 has an upwind-side heat exchange section 61 configuring the section of the outdoor heat exchanger 23 on the upwind side and a downwind-side heat exchange section 62 configuring the section of the outdoor heat exchanger 23 on the downwind side, and has a configuration where multiple rows (here, two rows) of heat exchange sections 61 and 62 are disposed so as to be adjacent to each other in the direction (a tube row direction) in which the outdoor air passes through the inside of the unit casing 51, which occurs because of the driving of the outdoor fan 36. The upwind-side heat exchange section 61 is disposed on the side nearer the side surface (here, the left side surface) and the back surface of the unit casing 51 than the downwind-side heat exchange section 62. That is, the section of the heat exchange section 60 positioned on the upwind side near the fan inlets 53a and 53b with respect to the direction in which the outdoor air passes is the upwind-side heat exchange section 61, and the section of the heat exchange section 60 positioned on the downwind side on the side farther away from the fan inlets 53a and 53b than the upwind-side heat exchange section 61 is the downwind-side heat exchange section 62. Additionally, the upwind-side heat exchange section 61 has an upwind-side primary heat exchange section 61a configuring the upper portion of the outdoor heat exchanger 23 and an upwind-side secondary heat exchange section 61b configuring the lower portion of the outdoor heat exchanger 23. Furthermore, the downwind-side heat exchange section 62 has a downwind-side primary heat exchange section 62a configuring the upper portion of the outdoor heat exchanger 23 and a downwind-side secondary heat exchange section 62b configuring the lower portion of the outdoor heat exchanger 23.

The heat exchange section 60 is an inserted fin-type heat exchange section configured by numerous heat transfer tubes 63 being flat tubes and numerous heat transfer fins 66 being inserted fins. The heat transfer tubes 63 are multi-hole flat tubes that are made of aluminum or aluminum alloy and have flat surfaces 64 serving as heat transfer surfaces and numerous small inside flow passages 65 through which the refrigerant flows. The numerous heat transfer tubes 63 are disposed in multiple tiers at an interval apart from each other along a predetermined tube tier direction in a state in which the flat surfaces 64 oppose each other and are disposed in multiple rows (here, two rows) so as to be adjacent to each other along a tube row direction (here, the direction in which the outdoor air passes) intersecting the tube tier direction and the longitudinal direction of the heat transfer tubes 63; one end portions (here, the left front end portions) in the longitudinal direction of the heat transfer tubes 63 are connected to the coupling header 74, and the other end portions (here, the right end portions) in the longitudinal direction of the heat transfer tubes 63 are connected to the inlet/outlet header 71 or the intermediate header 72. That is, the numerous heat transfer tubes 63 are disposed in multiple tiers and multiple rows and are disposed between the inlet/outlet header 71 and intermediate header 72 and the coupling header 74. Here, the flat surfaces 64 of the heat transfer tubes 63 face the vertical direction, so the tube tier direction means the vertical direction, and the heat transfer tubes 63 are disposed along the side surface (here, the left side surface) and the back surface of the unit casing 51, so the longitudinal direction of the heat transfer tubes 63 means a horizontal direction along the side surface (here, the left side surface) and the back surface of the unit casing 51. The plural heat transfer fins 66 are made of aluminum or aluminum alloy and are disposed at an interval apart from each other along the longitudinal direction of the heat transfer tubes 63. Numerous cutout portions 67 for inserting the heat transfer tubes 63 and extending along the tube row direction intersecting the tube tier direction and the longitudinal direction of the heat transfer tubes 63 are formed in the heat transfer fins 66. Here, because the tube tier direction is the vertical direction and the longitudinal direction of the heat transfer tubes 63 is a horizontal direction along the side surface (here, the left side surface) and the back surface of the unit casing 51, the tube row direction means a horizontal direction intersecting the longitudinal direction of the heat transfer tubes 63 and also coincides with the direction in which the outdoor air passes through the inside of the unit casing 51. The cutout portions 67 extend in a long and narrow manner in the horizontal direction from one edge portions in the tube row direction of the heat transfer fins 66 (here, the edge portions on the upwind side with respect to the direction in which the outdoor air passes). Additionally, here, the numerous heat transfer tubes 63 are divided into a heat transfer tube group configuring the upwind-side primary heat exchange section 61a, a heat transfer tube group configuring the upwind-side secondary heat exchange section 61b, a heat transfer tube group configuring the downwind-side primary heat exchange section 62a, and a heat transfer tube group configuring the downwind-side secondary heat exchange section 62b. Furthermore, the numerous heat transfer fins 66 are divided into a fin group configuring the row on the upwind side common to the upwind-side primary heat exchange section 61a and the upwind-side secondary heat exchange section 61b and a fin group configuring the row on the downwind side common to the downwind-side primary heat exchange section 62a and the downwind-side secondary heat exchange section 62b. It should be noted that the heat exchange section 60 is not limited to being an inserted fin-type heat exchange section employing inserted fins as the heat transfer fins 66 such as described above and may also be a corrugated fin-type heat exchange section employing numerous corrugated fins as the heat transfer fins 66.

<Refrigerant Distributor>

The refrigerant distributor 70 is connected between the liquid refrigerant pipe 35 and the lower portion of the inlet/outlet header 71. The refrigerant distributor 70 is a member that is made of aluminum or aluminum alloy and extends in the vertical direction (tube tier direction). The refrigerant distributor 70 distributes the refrigerant flowing in through the liquid refrigerant pipe 35 and guides the refrigerant to the lower portion of the inlet/outlet header 71, and also causes the refrigerant flowing in through the lower portion of the inlet/outlet header 71 to merge together and guides the refrigerant to the liquid refrigerant pipe 35.

<Inlet/Outlet Header>

The inlet/outlet header 71 is provided on the other end side (here, the right end side) of the upwind-side heat exchange section 61 of the heat exchange section 60. Additionally, the other end portions (here, the right end portions) in the longitudinal direction of the heat transfer tubes 63 (flat tubes) configuring the upwind-side heat exchange section 61 are connected to the inlet/outlet header 71. The inlet/outlet header 71 is a member that is made of aluminum or aluminum alloy and extends in the vertical direction (tube tier direction). The inside space of the inlet/outlet header 71 is partitioned into upper and lower spaces by a baffle (not shown in the drawings), so that the upper space communicates with the other end portions (here, the right end portions) of the heat transfer tubes 63 (flat tubes) configuring the upwind-side primary heat exchange section 61a and the lower space communicates with the other end portions (here, the right end portions) of the heat transfer tubes 63 (flat tubes) configuring the upwind-side secondary heat exchange section 61b. Additionally, the upper portion of the inlet/outlet header 71 is connected to the first gas refrigerant pipe 33 and exchanges refrigerant between the upwind-side primary heat exchange section 61a and the first gas refrigerant pipe 33. Furthermore, the lower portion of the inlet/outlet header 71 is connected to the refrigerant distributor 70 and exchanges refrigerant with the refrigerant distributor 70.

<Intermediate Header>

The intermediate header 72 is provided on the other end side (here, the right end side) of the downwind-side heat exchange section 62 of the heat exchange section 60. Additionally, the other end portions (here, the right end portions) of the heat transfer tubes 63 (flat tubes) configuring the downwind-side heat exchange section 62 are connected to the intermediate header 72. The intermediate header 72 is a member that is made of aluminum or aluminum alloy and extends in the vertical direction (tube tier direction). The inside space of the intermediate header 72 is partitioned into upper and lower spaces by a baffle (not shown in the drawings), so that the upper space communicates with the other end portions (here, the right end portions) of the heat transfer tubes 63 (flat tubes) configuring the downwind-side primary heat exchange section 62a and the lower space communicates with the other end portions (here, the right end portions) of the heat transfer tubes 63 (flat tubes) configuring the downwind-side secondary heat exchange section 62b. Furthermore, the upper space and the lower space in the intermediate header 72 are partitioned into plural spaces by baffles (not shown in the drawings) in accordance with the number of paths in the heat exchange section 60, and the upper space and the lower space communicate with each other through intermediate connecting pipes 73 and the like. Additionally, the intermediate header 72 exchanges refrigerant between the downwind-side primary heat exchange section 62a and the downwind-side secondary heat exchange section 62b.

<Coupling Header (Basic Configuration Only)>

The coupling header 74 is provided on the one end side (here, the left front end side) of the heat exchange section 60. Additionally, the one end portions (here, the left front end portions) of the heat transfer tubes 63 (flat tubes) configuring the heat exchange section 60 are connected to the coupling header 74. The coupling header 74 is a member that is made of aluminum or aluminum alloy and extends in the vertical direction (tube tier direction). Coupling passages (described later) for allowing the one end portions (here, the left front end portions) of the heat transfer tubes 63 (flat tubes) configuring the upwind-side heat exchange section 61 and the one end portions (here, the left front end portions) of the heat transfer tubes 63 (flat tubes) configuring the downwind-side heat exchange section 62 to communicate with each other are formed in the coupling header 74; because of this, the one end portions (here, the left front end portions) in the longitudinal direction of the heat transfer tubes 63 (flat tubes) adjacent to each other in the tube row direction communicate with each other. Additionally, the coupling header 74 exchanges refrigerant between the upwind-side heat exchange section 61 and the downwind-side heat exchange section 62.

In a case where the outdoor heat exchanger 23 having this kind of configuration functions as a refrigerant evaporator, the refrigerant flowing in from the liquid refrigerant pipe 35 is guided through the refrigerant distributor 70 and the lower portion of the inlet/outlet header 71 to the upwind-side secondary heat exchange section 61b as indicated by the arrows showing the flow of the refrigerant in FIG. 5. Then, the refrigerant that has passed through the upwind-side secondary heat exchange section 61b is guided through the lower portion of the coupling header 74 to the downwind-side secondary heat exchange section 62b. Then, the refrigerant that has passed through the downwind-side secondary heat exchange section 62b is guided through the intermediate header 72 to the downwind-side primary heat exchange section 62a. Then, the refrigerant that has passed through the downwind-side primary heat exchange section 62a is guided through the upper portion of the coupling header 74 to the upwind-side primary heat exchange section 61a. Then, the refrigerant that has passed through the upwind-side primary heat exchange section 61a flows out through the upper portion of the inlet/outlet header 71 to the first gas refrigerant pipe 33. The refrigerant evaporates because of the heat exchange with the outdoor air in the process of this flow of the refrigerant. Furthermore, in a case where the outdoor heat exchanger 23 functions as a refrigerant radiator, the refrigerant flowing in from the first gas refrigerant pipe 33 is guided through the upper portion of the inlet/outlet header 71 to the upwind-side primary heat exchange section 61a as indicated by the arrows showing the flow of the refrigerant in FIG. 5. Then, the refrigerant that has passed through the upwind-side primary heat exchange section 61a is guided through the upper portion of the coupling header 74 to the downwind-side primary heat exchange section 62a. Then, the refrigerant that has passed through the downwind-side primary heat exchange section 62a is guided through the intermediate header 72 to the downwind-side secondary heat exchange section 62b. Then, the refrigerant that has passed through the downwind-side secondary heat exchange section 62b is guided through the lower portion of the coupling header 74 to the upwind-side secondary heat exchange section 61b. Then, the refrigerant that has passed through the upwind-side secondary heat exchange section 61b flows out through the lower portion of the inlet/outlet header 71 and the refrigerant distributor 70 to the liquid refrigerant pipe 35. The refrigerant radiates heat because of the heat exchange with the outdoor air in the process of this flow of the refrigerant.

It should be noted that here the upwind-side heat exchange section 61 and the downwind-side heat exchange section 62 configuring the multiple row (here, two rows) heat exchange section 60 are each divided into two upper and lower tiers with the primary heat exchange sections 61a and 62a and the secondary heat exchange sections 61b and 62b, and these communicate with each other via the intermediate header 72 and the intermediate connecting pipes 73, but the upwind-side heat exchange section 61 and the downwind-side heat exchange section 62 are not limited to this and do not have to be divided into upper and lower tiers. In this case, the intermediate header 72 and the intermediate connecting pipes 73 become unnecessary. Furthermore, here, the plural heat transfer tubes 61 (flat tubes) disposed in multiple tiers along the predetermined tube tier direction (here, the vertical direction) are disposed in two rows so as to be adjacent to each other in the tube row direction (here, the direction in which the outdoor air passes) intersecting the tube tier direction and the longitudinal direction of the heat transfer tubes 61 (flat tubes), but the heat transfer tubes 63 are not limited to this and may also be disposed in three or more rows. In this case, it suffices to appropriately add the intermediate headers 72 and coupling headers 74 in accordance with the arrangement of the heat transfer tubes 61 (flat tubes) and the paths taken and connect them to the end portions in the longitudinal direction of the heat transfer tubes 61 (flat tubes).

(5) Detailed Configuration of Coupling Header

Figure 7:
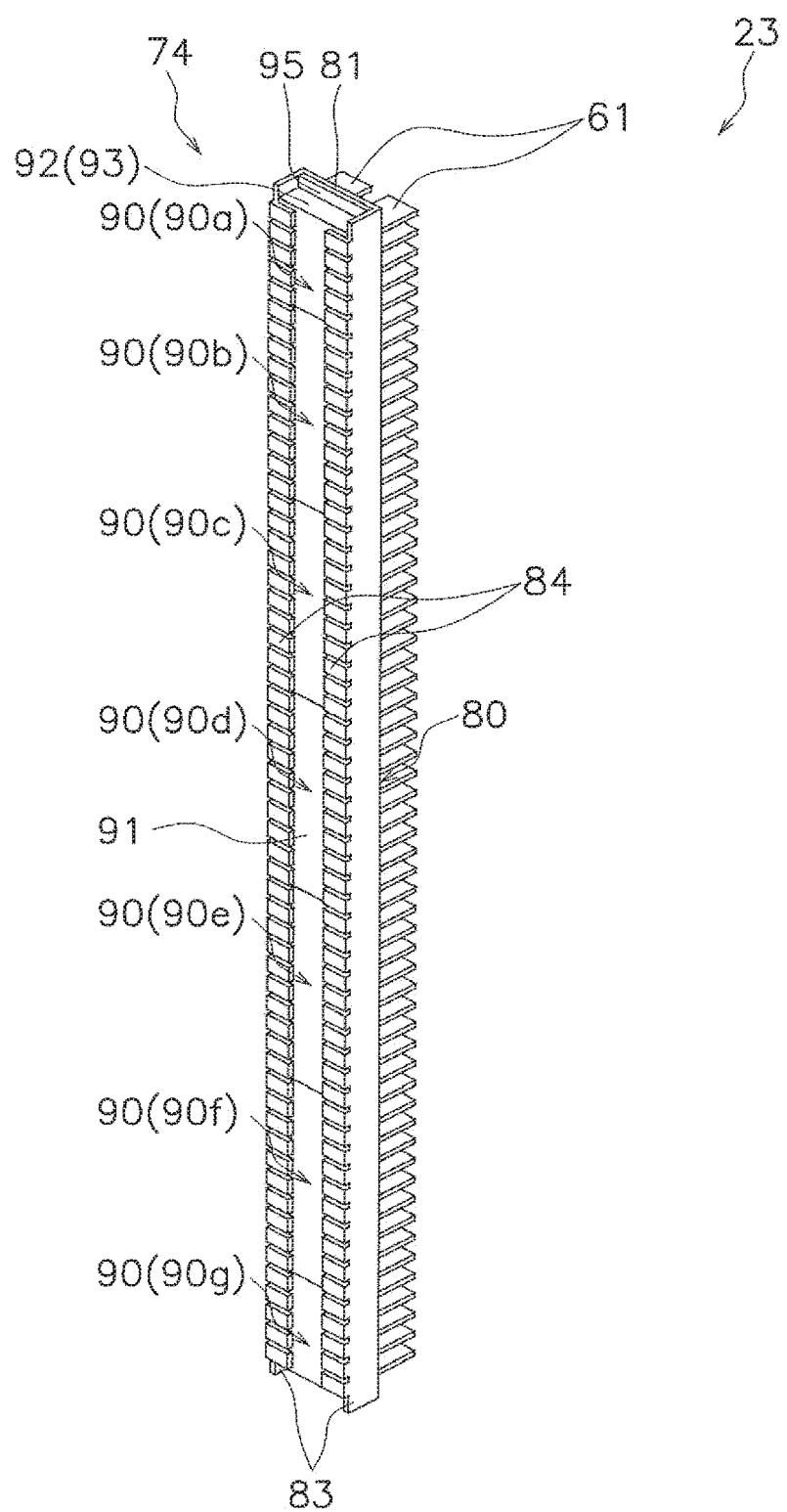
FIG. 7 is a partial enlarged view showing the vicinity of a coupling header of FIG. 5.
Figure 8:
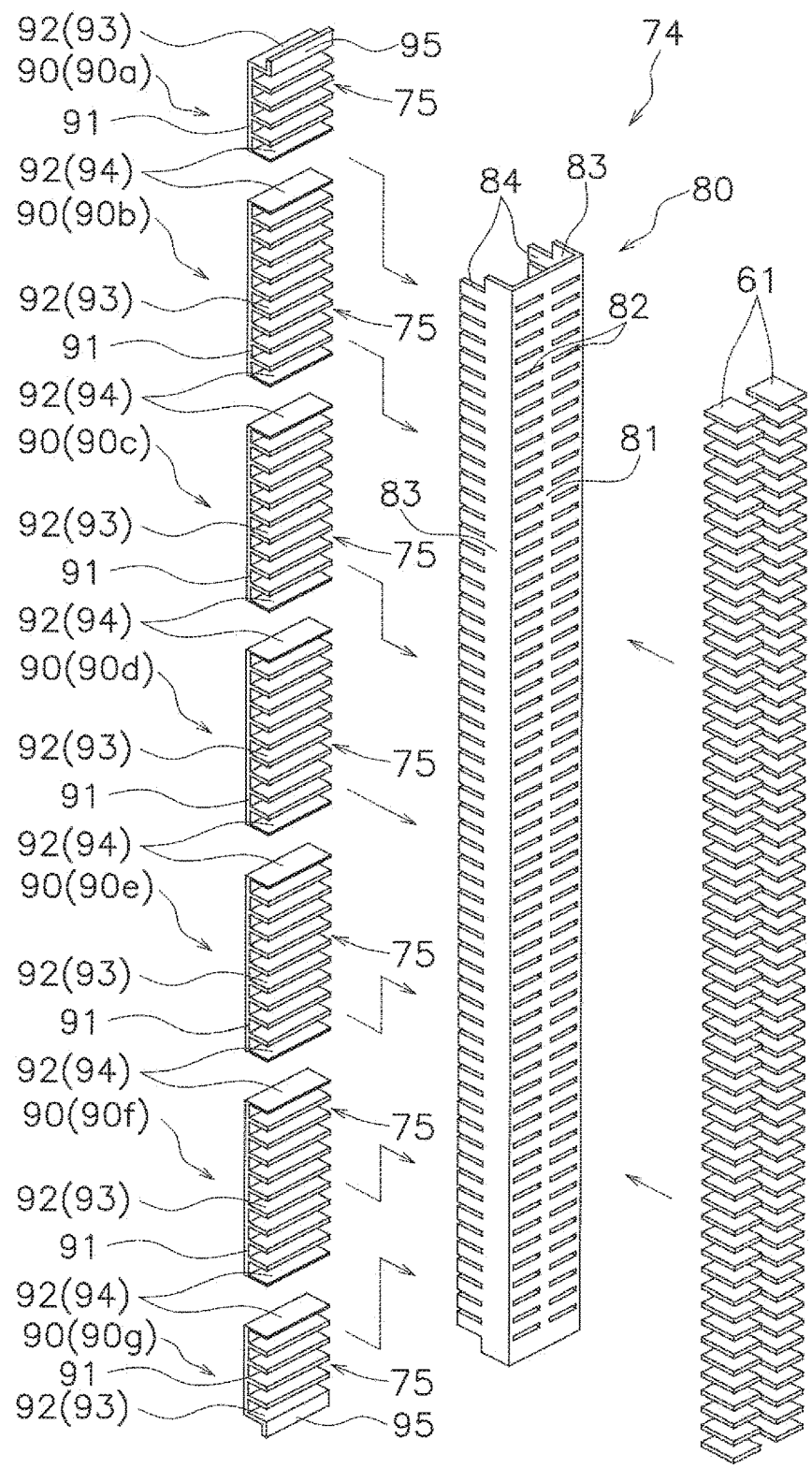
FIG. 8 is an exploded perspective view of the coupling header.
Figure 9:
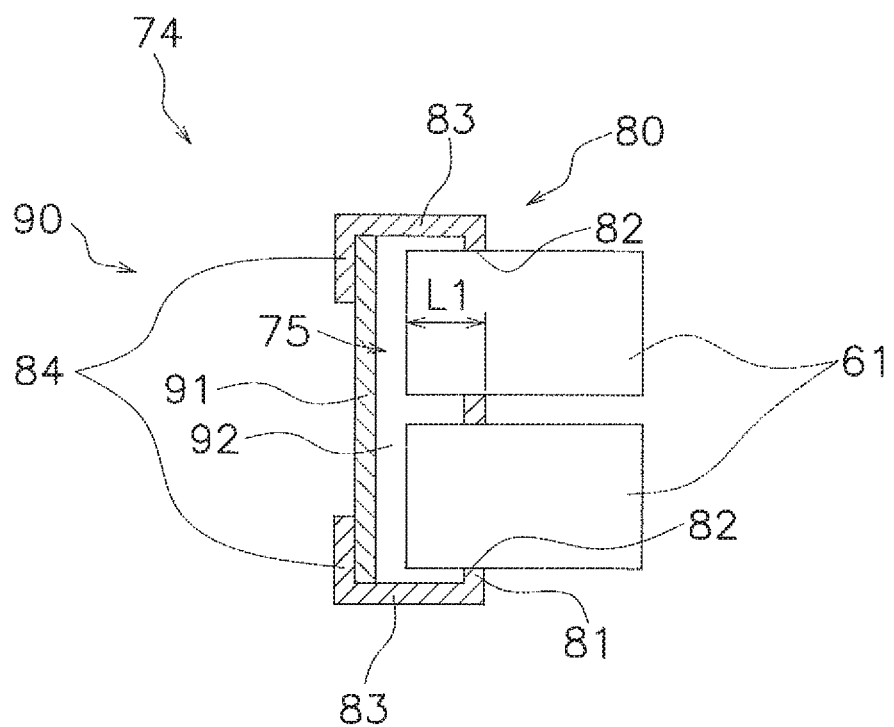
FIG. 9 is a plan sectional view of the coupling header.
Figure 10:
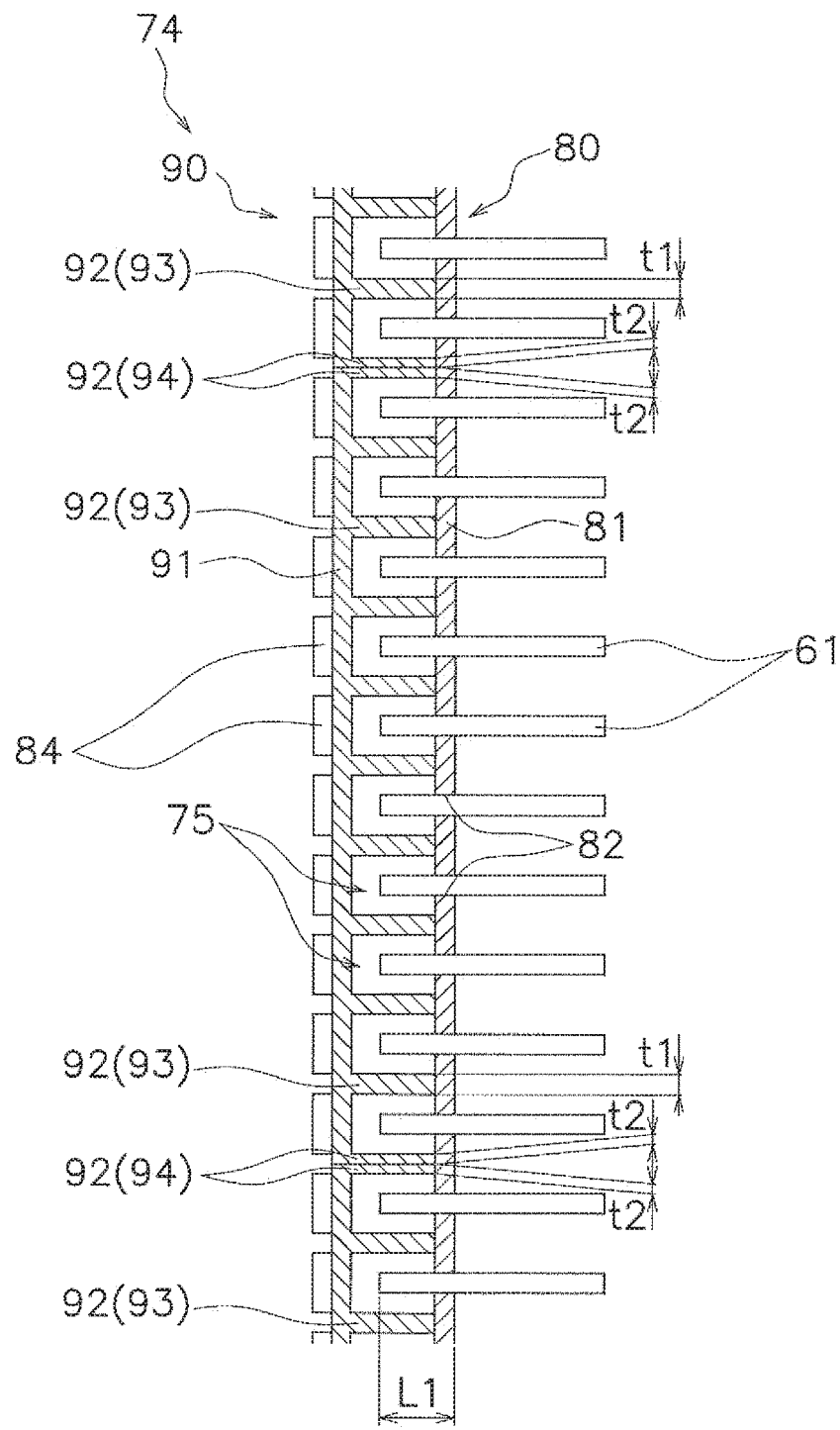
FIG. 10 is a longitudinal sectional view showing segments where second members of the coupling header contact each other in a tube tier direction.
Figure 11:
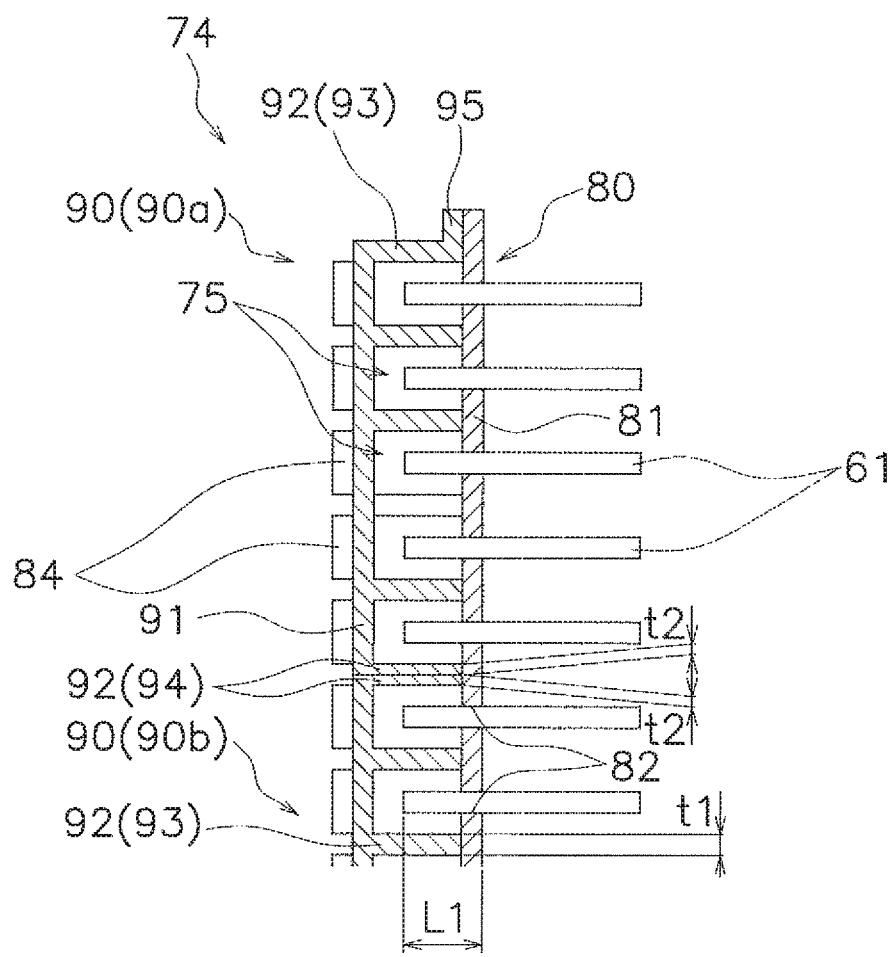
FIG. 11 is a longitudinal sectional view showing the vicinity of the second members configuring end portions in the tube tier direction of the coupling header (a state in which the second members have been assembled with its placement direction being correct).
Figure 12:
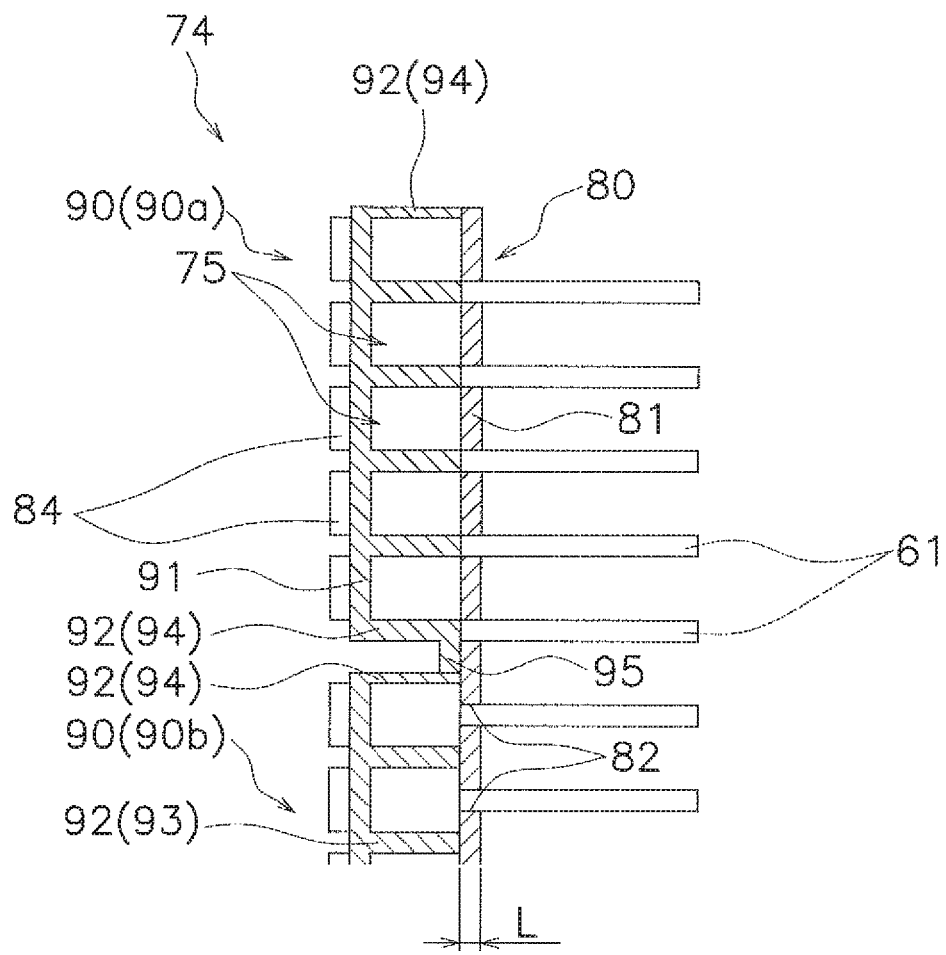
FIG. 12 is a longitudinal sectional view showing the vicinity of the second members configuring the end portions in the tube tier direction of the coupling header (a state in which the second members have been assembled with its placement direction being incorrect).

Next, the detailed configuration of the coupling header 74 will be described using FIG. 5 to FIG. 12. Here, FIG. 7 is a partial enlarged view showing the vicinity of the coupling header 74 of FIG. 5. FIG. 8 is an exploded perspective view of the coupling header 74. FIG. 9 is a plan sectional view of the coupling header 74. FIG. 10 is a longitudinal sectional view showing segments where second members 90 of the coupling header 74 contact each other in the tube tier direction. FIG. 11 is a longitudinal sectional view showing the vicinity of the second members 90 configuring end portions in the tube tier direction of the coupling header 74 (a state in which the second members 90 have been assembled with its placement direction being correct). FIG. 12 is a longitudinal sectional view showing the vicinity of the second members 90 configuring the end portions in the tube tier direction of the coupling header 74 (a state in which the second members 90 have been assembled with its placement direction being incorrect).

The coupling header 74 is configured as a result of a first member 80 and the second members 90 being joined to each other. The first member 80 is a member in which are formed plural through holes 82 through which pass the one end portions in the longitudinal direction of the plural heat transfer tubes 61 (flat tubes). The second members 90 are members that, when joined to the first member 80, form plural coupling passages 75 where the one end portions in the longitudinal direction of the heat transfer tubes 61 (flat tubes) adjacent to each other in the tube row direction (here, the horizontal direction) communicate with each other.

The first member 80 mainly has a first main wall portion 81. The first main wall portion 81 is a plate-shaped portion that is long in the tube tier direction, and the plural through holes 82 are formed in the first main wall portion 81. The plural through holes 82 are disposed in the first main wall portion 81 so as to correspond to the one end portions in the longitudinal direction of the plural heat transfer tubes 61 (flat tubes) disposed in multiple tiers and multiple rows. Here, the first main wall portion 81 forms a surface along the tube tier direction and the tube row direction, and the plural through holes 82 run through the first main wall portion 81 in a direction intersecting the tube tier direction and the tube row direction. Furthermore, the first member 80 has a pair of first auxiliary wall portions 83 that extend from the end portions in the tube row direction of the first main wall portion 81, along the longitudinal direction of the heat transfer tubes 61 (flat tubes), so as to sandwich the second members 90 in the tube row direction. The first auxiliary wall portions 83 are plate-shaped portions that are long in the tube tier direction, and form surfaces along the longitudinal direction of the heat transfer tubes 61 (flat tubes) and the tube tier direction. Furthermore, bending portions 84 are formed on the end portions of the first auxiliary wall portions 83 (here, the end portions on the side distant from the first main wall portion 81). The bending portions 84 are bent so as to sandwich the second members 90 between the bending portions 84 and the first main wall portion 81 in the longitudinal direction of the heat transfer tubes 61 (flat tubes). That is, the bending portions 84 formed on one side of the pair of first auxiliary wall portions 83 are bent toward the other side of the pair of first auxiliary wall portions 83, and the bending portions 84 formed on the other side of the pair of first auxiliary wall portions 83 are bent toward the one side of the pair of auxiliary wall portions 83. Here, the bending portions 84 are plural plate-shaped portions disposed along the tube tier direction.

The second members 90 each have a second wall portion 91 and plural coupling passage partition portions 92. The second wall portions 91 are members that oppose the one end portions in the longitudinal direction of the plural heat transfer tubes 61 (flat tubes) that have been passed through the through holes 82. The second wall portions 91 are plate-shaped members that are long in the tube tier direction. The coupling passage partition portions 92 are projecting portions that are formed so as to project from the second wall portions 91 toward the first main wall portion 81 side and partition the one end portions in the longitudinal direction of the heat transfer tubes 61 (flat tubes) adjacent to each other in the tube tier direction from each other. The coupling passage partition portions 92 are plate-shaped portions that are long in the tube row direction. The second wall portions 91 and the coupling passage partition portions 92—that is, the second members 90—are integrally formed by extrusion molding. The first main wall portion 81, the second wall portions 91, and the plural coupling passage partition portions 92 (projecting portions) form the plural coupling passages 75 where the one end portions in the longitudinal direction of the heat transfer tubes 61 (flat tubes) adjacent to each other in the tube row direction communicate with each other. Here, the pair of first auxiliary wall portions 83 contact both end portions in the tube row direction of the coupling passage partition portions 92 (projecting portions) and the second wall portions 91. Furthermore, the bending portions 84 are bent into contact with the second wall portions 91; because of this, the first member 80 and the second members 90 are provisionally fixed in place. Then, the first member 80 and the second members 90 are joined to each other by a brazing filler metal provided on surfaces of the coupling passage partition portions 92 (projecting portions).

Furthermore, the second members 90 are formed divided into plural (here, seven) second members 90a to 90g side by side in the tube tier direction. For this reason, the coupling header 74 is configured by joining, in the tube tier direction to the first member 80 in which are formed the through holes 82, the plural (here, seven) second members 90 (here, the second members 90a to 90g) that, when joined to the first member 80, form the plural coupling passages 75 where the one end portions in the longitudinal direction of the heat transfer tubes 61 (flat tubes) adjacent to each other in the tube row direction communicate with each other. That is, the second members 90 (here, the second members 90a to 90g) are joined to each other and to the first member 80 by a brazing filler metal provided on surfaces of the coupling passage partition portions 92 (projecting portions). Here, the second member 90 configuring one end portion (here, the upper end portion) in the tube tier direction of the coupling header 74 is a one end-side second member 90a, the second member 90 configuring the other end portion (here, the lower end portion) in the tube tier direction of the coupling header 74 is an other end-side second member 90g, and the second members 90 configuring the segments of the coupling header 74 between the end-side second members 90a and 90g are intermediate-side second members 90b to 90f. Additionally, the second members 90a to 90g have second wall portions 91a to 91g, which form parts of the second wall portion 91, and the plural coupling passage partition portions 92. It should be noted that here the second members 90 are formed divided into the seven second members 90a to 90g, but the second members 90 are not limited to this, and it suffices for them to be formed in the number according to the size in the tube tier direction of the coupling header 74.

Furthermore, the coupling passage partition portions 92 are disposed on the end portions in the tube tier direction of the second members 90a to 90g, and the coupling passage partition portions 92 of the second members 90 (here, the second members 90a to 90g) contact each other in the tube tier direction. Here, regarding the coupling passage partition portions 92, coupling passage partition portions 94 disposed in segments where the second members 90 (here, the second members 90a to 90g) contact each other in the tube tier direction are smaller in thickness in the tube tier direction compared to coupling passage partition portions 93 disposed in segments where the second members 90 (here, the second members 90a to 90g) do not contact each other in the tube tier direction. Here, a thickness t2 in the tube tier direction of the coupling passage partition portions 94 is half a thickness t1 in the tube tier direction of the coupling passage partition portions 93.

Furthermore, incorrect assembly prevention portions 95 for preventing incorrectness in the placement direction of the end-side second members 90a and 90g are formed in the second members 90 (here, the end-side second members 90a and 90g) configuring the end portions in the tube tier direction of the coupling header 74. In the one end-side second member 90a, the incorrect assembly prevention portion 95 is a projecting portion that projects outward in the tube tier direction (here, upward) from the end portion on the first main wall portion 81 side of the coupling passage partition portion 93 disposed on the endmost portion in the tube tier direction. Furthermore, in the other end-side second member 90g, the incorrect assembly prevention portion 95 is a projecting portion that projects outward in the tube tier direction (here, downward) from the end portion on the first main wall portion 81 side of the coupling passage partition portion 93 disposed on the endmost portion in the tube tier direction. The incorrect assembly prevention portions 95 have the function of limiting, so as to make smaller than a predetermined insertion length L1, an insertion length L of the plural heat transfer tubes 61 (flat tubes) with respect to the plural through holes 82 formed in segments of the first member 80 configuring the end portions in the tube tier direction of the coupling header 74 in a case where the placement direction of the second members (the end-side second members 90a and 90g) configuring the end portions in the tube tier direction of the coupling header 74 is incorrect. Here, a length H to which the incorrect assembly prevention portions 95 project outward in the tube tier direction is set in such a way that, in a case where the placement direction of the second members 90 (the end-side second members 90a and 90g) configuring the end portions in the tube tier direction of the coupling header 74 is incorrect, the plural coupling passage partition portions 93 formed in the end-side second members 90a and 90g are disposed in positions that oppose the through holes 82 in the first member 80 and block the insertion of the plural heat transfer tubes 61 (flat tubes) (FIG. 11 and FIG. 12 show the vicinity of the one end-side second member 90a).

The coupling header 74 has the following characteristics.

<A>

The coupling header 74 is a member that allows the one end portions in the longitudinal direction of the heat transfer tubes 61 (flat tubes) adjacent to each other in the tube row direction to communicate with each other in the outdoor heat exchanger 23 (heat exchanger) in which the plural heat transfer tubes 61 (flat tubes) are disposed in multiple tiers and multiple rows, and is configured from two types of members including the first member 80 and the second members 90 (hereinafter, this kind of structure will be called a "two-types-of-members structure"). For this reason, the coupling header 74 has the advantages that there are few joints and it is difficult for joining problems to occur.

Moreover, here, the first member 80 is a member including the first main wall portion 81 in which are formed the plural through holes 82 through which pass the one end portions in the longitudinal direction of the plural heat transfer tubes 61 (flat tubes), and the second members 90 are members including the second wall portions 91, which oppose the one end portions in the longitudinal direction of the plural heat transfer tubes 61 (flat tubes) that have been passed through the through holes 82, and the plural coupling passage partition portions 92 (projecting portions), which are formed so as to project from the second wall portions 91 toward the first main wall portion 81 side and partition the one end portions in the longitudinal direction of the heat transfer tubes 61 (flat tubes) adjacent to each other in the tube tier direction from each other. In this way, the coupling header 74 employs, as the second members 90 configuring the two-types-of-members structure, members having a shape where the plural coupling passage partition portions 92 (projecting portions) are formed projecting from the second wall portions 91, so it becomes easy to ensure an insertion amount (here, the insertion length L1) for the one end portions in the longitudinal direction of the heat transfer tubes 61 (flat tubes) adjacent to each other in the tube row direction. Additionally, here, the plural coupling passages 75 where the one end portions in the longitudinal direction of the heat transfer tubes 61 (flat tubes) adjacent to each other in the tube row direction communicate with each other are formed by the first main wall portion 81, the second wall portions 91, and the plural coupling passage partition portions 92 (projecting portions). That is, the plural coupling passage partition portions 92 (projecting portions) formed side by side in the tube tier direction partition the plural coupling passages 75 from each other in the tube tier direction. For this reason, it becomes easy to ensure the flow passage size (the spaces between the first main wall portion 81 and the second wall portions 91) in the depth direction of the coupling passages 75. For this reason, the joining together of the coupling header 74 and the heat transfer tubes 61 (flat tubes) becomes satisfactory, and pressure loss of the refrigerant in the coupling header 74 can be reduced.

<B>

Furthermore, in the coupling header 74, the second members 90 are formed by extrusion molding. For this reason, even a shape including the coupling passage partition portions 92 (projecting portions) whose projecting size is large can be easily formed.

<C>

Furthermore, the coupling header 74 is configured by joining, in the tube tier direction to the first member 80 in which are formed the plural through holes 82 through which pass the one end portions in the longitudinal direction of the plural heat transfer tubes 61 (flat tubes), the plural (here, seven) second members 90 (here, the second members 90a to 90g) that, when joined to the first member 80, form the plural coupling passages 75 where the one end portions in the longitudinal direction of the heat transfer tubes 61 (flat tubes) adjacent to each other in the tube row direction communicate with each other. In this way, the coupling header 74 employs the two-types-of-members structure where the plural (here, seven) second members 90 configuring the coupling header 74 are joined to each other in the tube tier direction, so lengthening of the coupling header 74 can be accommodated. For this reason, the outdoor heat exchanger 23 (heat exchanger) whose size in the tube tier direction is large can also be accommodated.

Furthermore, in the case of forming the second members 90 by extrusion molding, there are limitations on the sizes of molds capable of extrusion molding, so it is difficult to obtain the long second member 90 with a single member, but by joining to each other in the tube tier direction the plural (here, seven) second members 90 (here, the second members 90a to 90g) that have been extruded, the long second member 90 can be obtained.

<D>

Furthermore, in the coupling header 74, the first member 80 and the second members 90 are joined to each other by the brazing filler metal provided on the surfaces of the coupling passage partition portions 92 (projecting portions). For this reason, here, the first member 80 and the second members 90 can be joined to each other by brazing utilizing the coupling passage partition portions 92 (projecting portions) of the second members 90. Specifically, the first member 80 further includes the pair of first auxiliary wall portions 83 that extend from the end portions in the tube row direction of the first main wall portion 81, along the longitudinal direction of the heat transfer tubes 61 (flat tubes), so as to sandwich the second members 90 in the tube row direction. For this reason, the first member 80 and the second members 90 can be joined to each other by brazing the first main wall portion 81 and the pair of first auxiliary wall portions 83 to the coupling passage partition portions 92 (projecting portions).

Furthermore, here, the second members 90 (here, the second members 90a to 90g) are also joined to each other by the brazing filler metal provided on the surfaces of the coupling passage partition portions 92 (projecting portions). For this reason, here, the first member 80 and the second members 90 can be joined to each other by brazing utilizing the coupling passage partition portions 92 (projecting portions) of the second members 90.

Furthermore, here, the bending portions 84 are formed in the first member 80 on the end portions on the second wall portion 91 side of the first auxiliary wall portions 83, and the bending portions 84 are bent into contact with the second wall portions 91. For this reason, here, the first member 80 and the second members 90 can be provisionally fixed in place by the bending portions 84 when joining the first member 80 and the second members 90 to each other by brazing.

<E>

Furthermore, in the coupling header 74, the thickness t2 in the tube tier direction of the coupling passage partition portions 94 (projecting portions) disposed in segments where the second members 90 (here, the second members 90a to 90g) contact each other in the tube tier direction is smaller than the thickness t1 in the tube tier direction of the coupling passage partition portions 93 (projecting portions) disposed in segments where the second members 90 (here, the second members 90a to 90g) do not contact each other in the tube tier direction. For this reason, here, the pressure resistance performance of the coupling header 74 in segments where the second members 90 (here, the second members 90a to 90g) contact each other in the tube tier direction can be ensured without having to needlessly increase the thickness (=t2+t2) in the tube tier direction of the coupling passage partition portions 94 (projecting portions) disposed in segments where the second members 90 (here, the second members 90a to 90g) contact each other in the tube tier direction.

In particular, here, the thickness t1 in the tube tier direction of the coupling passage partition portions 93 (projecting portions) disposed in segments where the second members 90 (here, the second members 90a to 90g) contact each other in the tube tier direction is half the thickness t2. In the tube tier direction of the coupling passage partition portions 94 (projecting portions) disposed in segments where the second members 90 (here, the second members 90a to 90g) do not contact each other in the tube tier direction. For this reason, here, the thickness (=t2+t2) in the tube tier direction of the coupling passage partition portions 94 disposed in segments where the second members 90 (here, the second members 90a to 90g) contact each other in the tube tier direction is made the same as the thickness t1 of the coupling passage partition portions 93 (projecting portions) disposed in segments where the second members 90 (here, the second members 90a to 90g) do not contact each other in the tube tier direction, so that an equal pressure resistance performance can be ensured in all segments in the tube tier direction.

<F>

Furthermore, in the coupling header 74, the incorrect assembly prevention portions 95 for preventing placement direction incorrectness are formed in the second members 90 (here, the end-side second members 90a and 90g) configuring the end portions in the tube tier direction of the coupling header 74. For this reason, here, by forming the incorrect assembly prevention portions 95 in the second members 90 (here, the end-side second members 90a and 90g) configuring the end portions in the tube tier direction of the coupling header 74, the second members 90 (here, the end-side second members 90a and 90g) configuring the end portions in the tube tier direction of the coupling header 74 can be assembled to the segments of the first member 80 configuring the end portions in the tube tier direction of the coupling header 74 without getting the placement direction incorrect.

In particular, here, the incorrect assembly prevention portions 95 limit, so as to make smaller than the predetermined insertion length L1, the insertion length L of the plural heat transfer tubes 61 (flat tubes) with respect to the plural through holes 82 formed in segments of the first member 80 configuring the end portions in the tube tier direction of the coupling header 74 in a case where the placement direction of the second members 90 (here, the end-side second members 90a and 90g) configuring the end portions in the tube tier direction of the coupling header 74 is incorrect. For this reason, here, in a case where the placement direction of the second members 90 (here, the end-side second members 90a and 90g) configuring the end portions in the tube tier direction of the coupling header 74 is incorrect, the insertion length L of the heat transfer tubes 61 (flat tubes) with respect to the through holes 82 in the first member 80 becomes insufficient because of the incorrect assembly prevention portions 95, and because of this, the fact that the placement direction of the second members 90 (here, the end-side second members 90a and 90g) configuring the end portions in the tube tier direction of the coupling header 74 is incorrect can be recognized.

(6) Example Modifications

In the outdoor heat exchanger 23 (heat exchanger) pertaining to the embodiment, the incorrect assembly prevention portions 95 for preventing incorrectness in the placement direction of the end-side second members 90a and 90g are formed in the second members 90 (here, the end-side second members 90a and 90g) configuring the end portions in the tube tier direction of the coupling header 74. Additionally, the incorrect assembly prevention portions 95 being projecting portions that project outward in the tube tier direction (here, upward and downward) from the end portions on the first main wall portion 81 side of the coupling passage partition portions 93 disposed on the endmost portions in the tube tier direction.

However, the incorrect assembly prevention portions 95 are not limited to this and can employ a variety of shapes.

Figure 13:
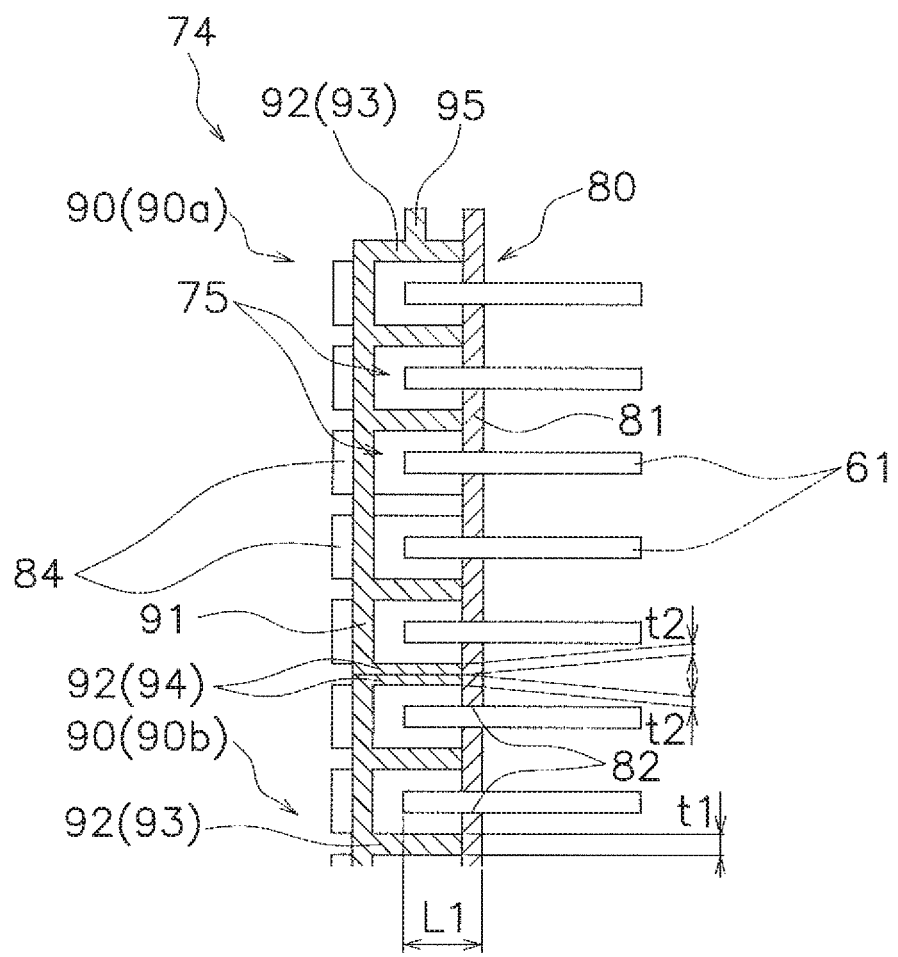
FIG. 13 is a drawing, corresponding to FIG. 11, showing a heat exchanger pertaining to an example modification.

For example, as shown in FIG. 13, the incorrect assembly prevention portions 95 being projecting portions that project outward in the tube tier direction (here, upward) may also be formed in segments in the vicinity of the middle in the depth direction of the coupling passage partition portions 93 disposed on the endmost portions in the tube tier direction. This case also, as with the incorrect assembly prevention portions 95 in the embodiment, in a case where the placement direction of the second members 90 (here, the end-side second members 90a and 90g) configuring the end portions in the tube tier direction of the coupling header 74 is incorrect, a state in which the insertion length L of the heat transfer tubes 61 (flat tubes) with respect to the through holes 82 in the first member 80 is insufficient is produced so that the fact that the placement direction of the second members 90 (here, the end-side second members 90a and 90g) configuring the end portions in the tube tier direction of the coupling header 74 is incorrect can be recognized.

Figure 14:
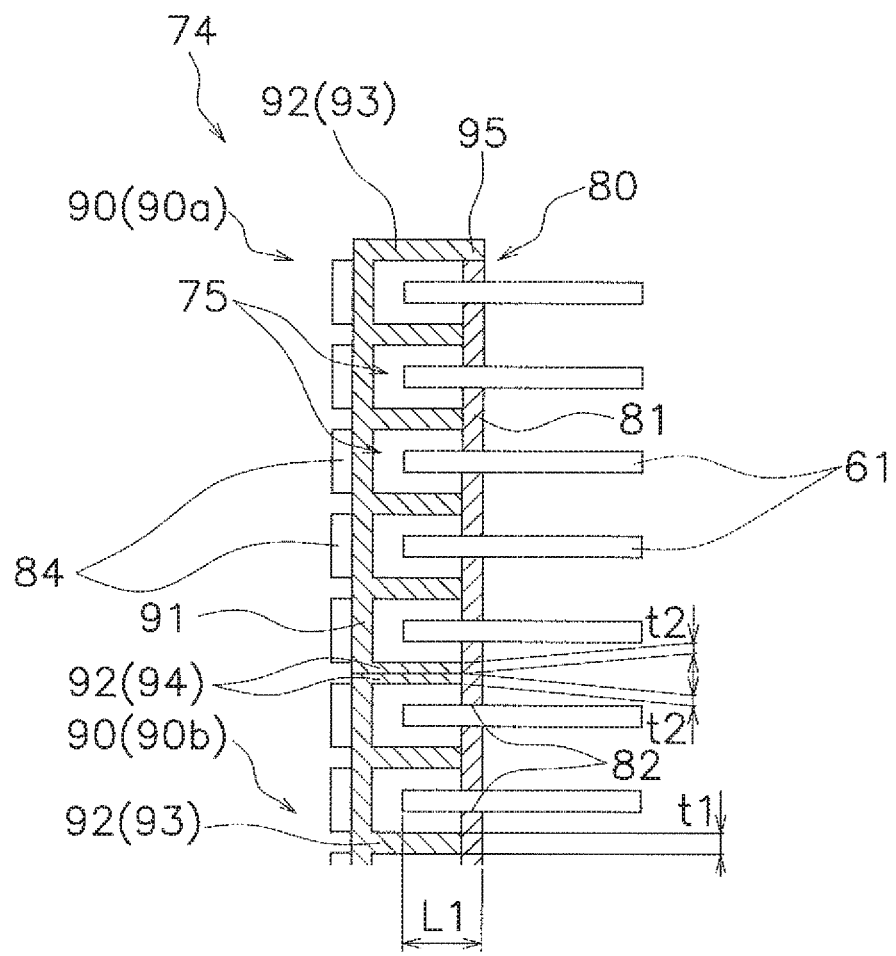
FIG. 14 is a drawing, corresponding to FIG. 11, showing a heat exchanger pertaining to an example modification.
Figure 15:
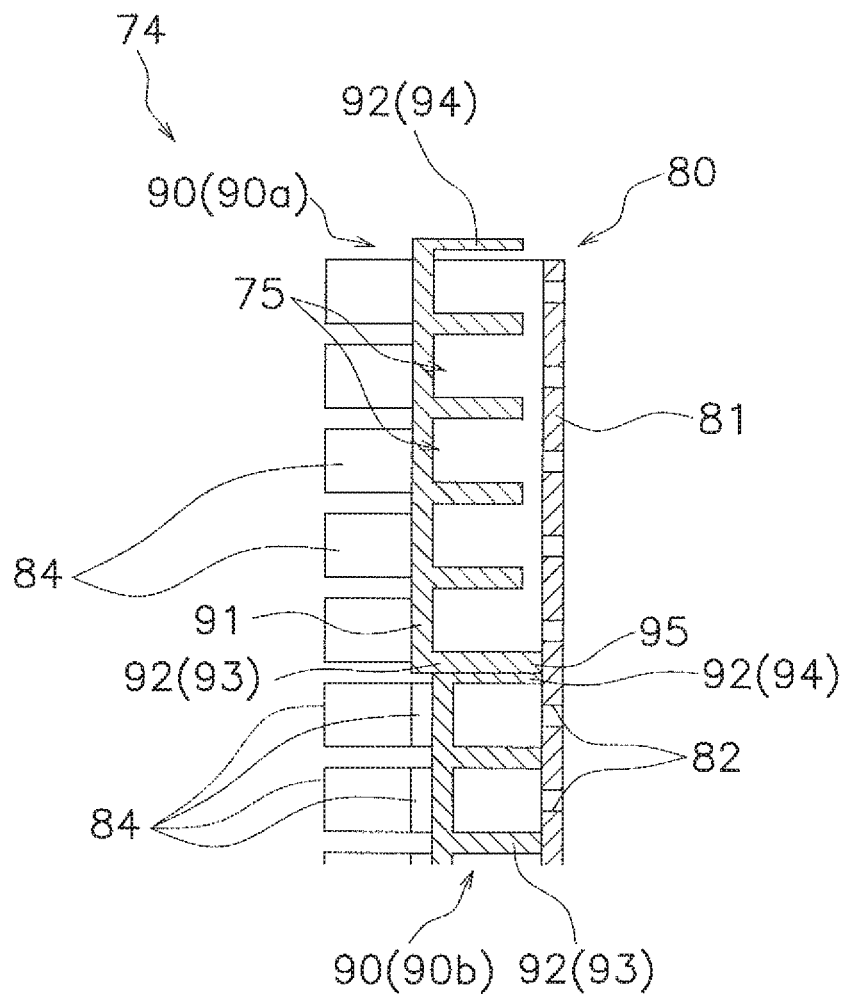
FIG. 15 is a drawing, corresponding to FIG. 12, showing a heat exchanger pertaining to an example modification.

Furthermore, as shown in FIG. 14 and FIG. 15, the incorrect assembly prevention portions 95 being projecting portions may also be configured to project further toward the first main wall portion 81 side from the end portions on the first main wall portion 81 side of the coupling passage partition portions 93 disposed on the endmost portions in the tube tier direction. In this case, in a case where the placement direction of the second members 90 (here, the end-side second members 90a and 90g) configuring the end portions in the tube tier direction of the coupling header 74 is incorrect, a state arises where the end portions on the first main wall portion 81 side of the coupling passage partition portions 93 and 94 disposed outside the endmost portions in the tube tier direction do not contact the first main wall portion 81 of the first member 80. Because of this, the fact that the placement direction of the second members 90 (here, the end-side second members 90a and 90g) configuring the end portions in the tube tier direction of the coupling header 74 is incorrect can be recognized. Specifically, here, because this kind of a state arises, the bending portions 84 corresponding to the second members 90 (here, the end-side second members 90a and 90g) configuring the end portions in the tube tier direction of the coupling header 74 become unable to be bent as intended, and because of this, the fact that the placement direction of the second members 90 (here, the end-side second members 90a and 90g) configuring the end portions in the tube tier direction of the coupling header 74 is incorrect can be recognized.

Furthermore, although it is not shown in the drawings here, rather than the plural through holes 82 being formed in the first member 80, the plural through holes 82 may also be formed in the second members 90. That is, the second members 90 becomes members in which are formed the plural through holes 82 through which pass the one end portions in the longitudinal direction of the plural heat transfer tubes 61 (flat tubes) and which, when joined to the first member 80, form the plural coupling passages 75 where the one end portions in the longitudinal direction of the heat transfer tubes 61 (flat tubes) adjacent to each other in the tube row direction communicate with each other.

In this case also, the coupling header 74 employs the two-types-of-members structure where the plural second members 90 configuring the coupling header 74 are joined to each other in the tube tier direction, so as in the embodiment, a lengthening of the coupling header 74 can be accommodated and a heat exchanger whose size in the tube tier direction is large can also be accommodated.

INDUSTRIAL APPLICABILITY

The present invention is widely applicable to heat exchangers where plural flat tubes disposed in multiple tiers along a predetermined tube tier direction are disposed in multiple rows so as to be adjacent to each other in a tube row direction intersecting the tube tier direction and the longitudinal direction of the flat tubes and where one end portions in the longitudinal direction of the flat tubes adjacent to each other in the tube row direction communicate with each other via a coupling header.

What is claimed is:
1. A heat exchanger comprising:
a plurality of flat tubes disposed in multiple tiers along a predetermined tube tier direction and disposed in multiple rows so as to be adjacent to each other in a tube row direction intersecting the tube tier direction and the longitudinal direction of the flat tubes; and
a coupling header, first end portions of the flat tubes along the longitudinal direction that are adjacent to each other in the tube row direction communicating with each other via the coupling header,
the coupling header comprising a first member and a plurality of second members, the second members being joined to each other along the tube tier direction and joined to the first member, the first member having a plurality of through holes formed therein through which the first end portions of the plurality of flat tubes pass, and the plurality of second members when joined to the first member forming a plurality of coupling passages where the first end portions of the flat tubes adjacent to each other in the tube row direction communicate with each other,
each of the second members having a plurality of coupling passage partition portions formed thereon, the coupling passage partition portions of the second members partitioning the plurality of coupling passages from each other in the tube tier direction, the coupling passage partition portions being formed side by side along the tube tier direction,
the second members being joined such that respective endmost ones of the coupling passage partition portions contact each other along the tube tier direction, each of the coupling passage partition portions that contact each other along the tube tier direction having a first thickness in the tube tier direction smaller than a second thickness in the tube tier direction of the coupling passage partition portions disposed in segments where the second members are not joined to each other along the tube tier direction, and
each of the coupling passage partition portions being a plate-shaped portion extending parallel to the longitudinal direction of the flat tubes, with a dimension of the plate-shaped portion along the longitudinal direction of the flat tubes being larger than the first thickness and the second thickness, and wherein the first thickness is half the second thickness such that a combined thickness in the tube tier direction of the endmost ones of the coupling passage partition portions that contact each other is equal to the thickness in the tube tier direction of the coupling passage partition portions disposed in the segments where the second members are not joined to each other along the tube tier direction.

2. The heat exchanger according to claim 1, wherein the second members are joined to each other and to the first member by a brazing filler metal provided on surfaces of the coupling passage partition portions.

3. The heat exchanger according to claim 1, wherein the second members have incorrect assembly prevention portions formed therein that are arranged to prevent placement direction incorrectness, and the incorrect assembly prevention portions form end portions along the tube tier direction of the coupling header.

4. The heat exchanger according to claim 3, wherein the incorrect assembly prevention portions limit an insertion length of the plurality of flat tubes so as to be smaller than a predetermined insertion length with respect to the plurality of through holes formed in segments of the first member forming the end portions along the tube tier direction of the coupling header when the placement direction of the second members forming the end portions in the tube tier direction of the coupling header is incorrect.

5. The heat exchanger according to claim 1, wherein the second members are joined to each other and to the first member by a brazing filler metal provided on surfaces of the coupling passage partition portions.

6. The heat exchanger according to claim 1, wherein the second members have incorrect assembly prevention portions formed therein that are arranged to prevent placement direction incorrectness, and the incorrect assembly prevention portions form end portions along the tube tier direction of the coupling header.

7. The heat exchanger according to claim 6, wherein the incorrect assembly prevention portions limit an insertion length of the plurality of flat tubes so as to be smaller than a predetermined insertion length with respect to the plurality of through holes formed in segments of the first member forming the end portions along the tube tier direction of the coupling header when the placement direction of the second members forming the end portions in the tube tier direction of the coupling header is incorrect.

8. The heat exchanger according to claim 2, wherein the second members have incorrect assembly prevention portions formed therein that are arranged to prevent placement direction incorrectness, and the incorrect assembly prevention portions form end portions along the tube tier direction of the coupling header.

9. The heat exchanger according to claim 8, wherein the incorrect assembly prevention portions limit an insertion length of the plurality of flat tubes so as to be smaller than a predetermined insertion length with respect to the plurality of through holes formed in segments of the first member forming the end portions along the tube tier direction of the coupling header when the placement direction of the second members forming the end portions in the tube tier direction of the coupling header is incorrect.

10. The heat exchanger according to claim 1, wherein each of the second members includes a wall portion that is plate-shaped and extends in the tube tier direction, and
the coupling passage partition portions project from the wall portion.

11. The heat exchanger according to claim 10, wherein the wall portions and the coupling passage partition portions of each of the second members are integrally formed by extrusion molding.

12. The heat exchanger according to claim 1, wherein the plurality of second members includes two end-side second members and at least one intermediate-side second member disposed between the end-side second members, the end-side second members forming end portions of the coupling header in the tube tier direction.

13. The heat exchanger according to claim 12, wherein each of the end-side second members includes an incorrect assembly prevention portion, the incorrect assembly prevention portion being configured as a projection arranged on an endmost portion of the end-side second member and projecting outward away from the at least one intermediate-side second member in the tube tier direction when the end-side when the end-side second member is assembled correctly.

14. The heat exchanger according to claim 12, wherein each of the end-side second members includes an incorrect assembly prevention portion, the incorrect assembly prevention portion being configured as a plate-shaped portion arranged on an endmost portion of the end-side second member and projecting along the longitudinal direction of the flat tubes farther than the coupling passage partition portions.

15. The heat exchanger according to claim 1, wherein the first member includes
a plate-shaped first main wall portion that is elongated in the tube tier direction and includes the plurality of through holes,
a pair of first auxiliary wall portions that extend from end portions in the tube row direction of the first main wall portion, and
a plurality of bending portions that extend from the first auxiliary wall portions and are bent so as to sandwich the second members between the bending portions and the first main wall portion.

16. The heat exchanger according to claim 1, wherein the coupling passages have a uniform dimension in the tube tier direction such that an equal pressure resistance performance can be ensured in all segments in the tube tier direction.

* * * * *